(12) United States Patent
Monden et al.

(10) Patent No.: US 8,889,315 B2
(45) Date of Patent: Nov. 18, 2014

(54) CATALYST, PROCESS FOR PREPARING THE SAME, AND USES OF THE CATALYST

(75) Inventors: Ryuji Monden, Chiba (JP); Hiroshi Konuma, Chiba (JP); Toshikazu Shishikura, Chiba (JP); Tadatoshi Kurozumi, Chiba (JP)

(73) Assignee: Showa Denko K.K., Tokyo (JP)

( * ) Notice: Subject to any disclaimer, the term of this patent is extended or adjusted under 35 U.S.C. 154(b) by 560 days.

(21) Appl. No.: 12/676,818

(22) PCT Filed: Aug. 8, 2008

(86) PCT No.: PCT/JP2008/064368
§ 371 (c)(1),
(2), (4) Date: Mar. 5, 2010

(87) PCT Pub. No.: WO2009/031383
PCT Pub. Date: Mar. 12, 2009

(65) Prior Publication Data
US 2010/0227253 A1      Sep. 9, 2010

(30) Foreign Application Priority Data

Sep. 7, 2007  (JP) ................................. 2007-232565
Jan. 23, 2008  (JP) ................................. 2008-012844

(51) Int. Cl.
| | |
|---|---|
| H01M 4/38 | (2006.01) |
| H01M 4/92 | (2006.01) |
| H01M 4/90 | (2006.01) |
| H01M 4/96 | (2006.01) |
| B01J 27/20 | (2006.01) |
| B01J 27/24 | (2006.01) |
| H01M 4/88 | (2006.01) |
| H01M 8/10 | (2006.01) |

(52) U.S. Cl.
CPC ............. *H01M 4/9016* (2013.01); *B01J 27/24* (2013.01); *Y02E 60/50* (2013.01); *H01M 4/8828* (2013.01); *H01M 2008/1095* (2013.01); *H01M 4/90* (2013.01); *H01M 4/96* (2013.01)
USPC ........... 429/485; 429/523; 429/524; 429/525; 429/528; 502/174

(58) Field of Classification Search
None
See application file for complete search history.

(56) References Cited

U.S. PATENT DOCUMENTS

| | | |
|---|---|---|
| 3,492,100 A | 1/1970 | Roubin et al. |
| 4,581,289 A | 4/1986 | Dietrich et al. |
| 4,657,776 A | 4/1987 | Dietrich et al. |
| 4,699,800 A | 10/1987 | Dustmann et al. |
| 4,734,339 A * | 3/1988 | Schachner et al. ............ 428/701 |
| 4,828,664 A | 5/1989 | Dietrich et al. |
| 7,767,330 B2 | 8/2010 | Merzougui et al. |
| 2003/0218857 A1 | 11/2003 | Omori et al. |
| 2007/0128884 A1 | 6/2007 | Ota et al. |

FOREIGN PATENT DOCUMENTS

| | | |
|---|---|---|
| EP | 0 053 018 A1 | 6/1982 |
| FR | 1 508 370 | 1/1968 |
| JP | 2003-342058 A | 12/2000 |
| JP | 2003-012375 A | 1/2003 |
| JP | 2005-161203 A | 6/2005 |
| JP | 2006-107967 A | 4/2006 |
| JP | 2006-198570 A | 8/2006 |
| JP | 2007-31781 A | 2/2007 |
| WO | 02/093596 A1 | 11/2002 |
| WO | 2006/119407 A2 | 11/2006 |

OTHER PUBLICATIONS

Ohgi, Y et al. "Catalytic activity of partially-oxidzed transition metal carbonitrides for oxygen reduction reaction", Electrochem Soc of Japan, Mar. 29, 2007, p. 94. Submitted in copending U.S. Appl. No. 12/863,400.*
Canadian Office Action issued in Canadian Application No. 2721138 dated Feb. 20, 2012.
D.V. Schur et al., "Niobium as a construction material for a hydrogen energy system," International Journal of Hydrogen Energy, Elsevier Science Publishers B.V., Barking, GB, vol. 20, No. 5, May 1, 1995, pp. 405-407, XP004041162.
Supplementary European Search Report issued on Oct. 29, 2013 from the European Patent Office in corresponding European Application No. 08792352.0.
Japanese Office Action issued on Sep. 10, 2013 in Japanese Application No. 2009-531167.

\* cited by examiner

*Primary Examiner* — Sarah A Slifka
(74) *Attorney, Agent, or Firm* — Sughrue Mion, PLLC

(57) ABSTRACT

The present invention provides a catalyst which is not corroded in an acidic electrolyte or at a high potential, is excellent in durability and has high oxygen reduction ability. The catalyst of the present invention is characterized by including a niobium oxycarbonitride. The catalyst of the invention is also characterized by including a niobium oxycarbonitride represented by the composition formula $NbC_xN_yO_z$, wherein x, y and z represent a ratio of the numbers of atoms and are numbers satisfying the conditions of $0.01 \leq x \leq 2$, $0.01 \leq y \leq 2$, $0.01 \leq z \leq 3$ and $x+y+z \leq 5$.

15 Claims, 16 Drawing Sheets

CATALYST, PROCESS FOR PREPARING THE SAME, AND USES OF THE CATALYST

TECHNICAL FIELD

The present invention relates to a catalyst, a process for preparing the same, and uses of the catalyst.

BACKGROUND ART

Fuel cells are classified into various types according to the type of electrolyte and the type of electrode, and as typical fuel cells, there are fuel cells of alkali type, phosphoric acid type, molten carbonate type, solid electrolyte type and solid polymer type. Of these, the solid polymer type fuel cells capable of working at a temperature of a low temperature (about −40° C.) to about 120° C. have been paid attention, and in recent years, development and practical use of them as low pollution power sources for automobiles have been promoted. As uses of the solid polymer type fuel cells, vehicle driving sources or stationary electric sources have been studied, but in order to apply the fuel cells to these uses, durability over a long term is desired.

This polymer solid type fuel cell is a fuel cell of such a type that a polymer solid electrolyte is interposed between an anode and a cathode, a fuel is supplied to the anode, oxygen or air is supplied to the cathode, and oxygen is reduced in the cathode to take out electricity. As the fuel, hydrogen, methanol or the like is mainly used.

In order to raise the reaction rate of the fuel cell and to enhance energy conversion efficiency of the fuel cell, a layer containing a catalyst (also referred to as a "catalyst layer for a fuel cell" hereinafter) has been provided on a surface of the cathode (air electrode) or a surface of the anode (fuel electrode) of the fuel cell in the past.

As this catalyst, a precious metal has been generally used, and of precious metals, platinum that is stable at a high potential and has high activity has been mainly used. However, since platinum is high in price and is limited on the resource quantity, development of catalysts capable of substitution has been desired.

Further, precious metals used for the cathode surface sometimes dissolve in an acidic atmosphere, and there is a problem that they are not suitable for uses requiring durability over a long term. On this account, development of catalysts which are not corroded in an acidic atmosphere, are excellent in durability and have high oxygen reduction ability has been eagerly desired.

As substitute catalysts for platinum, materials containing nonmetals, such as carbon, nitrogen and boron, have been paid attention in recent years. The materials containing nonmetals are low in price and rich in the resource quantity as compared with precious metals such as platinum.

In a non-patent document 1, it is reported that a ZrOxN compound containing zirconium as a base exhibits oxygen reduction ability.

In a patent document 1, an oxygen reduction electrode material containing a nitride of one or more elements selected from elements of Group 4, Group 5 and Group 14 of the long-form periodic table is disclosed as a substitute material for platinum.

In the materials containing these nonmetals, however, there is a problem that practically sufficient oxygen reduction ability as a catalyst has not been obtained.

In a patent document 2, an oxycarbonitride obtained by mixing a carbide, an oxide and a nitride and then heat treating the mixture at 500 to 1500° C. under vacuum or in an inert or non-oxidizing atmosphere is disclosed.

The oxycarbonitride disclosed in the patent document 2, however, is a material for a thin film magnetic head ceramic substrate, and it has not been studied to use this oxycarbonitride as a catalyst.

Platinum is useful not only as the above catalyst for a fuel cell but also as a catalyst for exhaust gas treatment or a catalyst for organic synthesis, but platinum is high in price and limited on the resource quantity, so that development of catalysts capable of substitution has been desired also in these uses.

Non-patent document 1: S. Doi, A. Ishihara, S. Mitsushima, N. Kamiya, and K. Ota, Journal of The Electrochemical Society, 154 (3) B362-B369 (2007)

Patent document 1: JP-A 2007-31781

Patent document 2: JP-A 2003-342058

DISCLOSURE OF THE INVENTION

Problem to be Solved by the Invention

The present invention is intended to solve such problems associated with the prior art as mentioned above, and it is an object of the present invention to provide a catalyst which is not corroded in an acidic electrolyte or at a high potential, is excellent in durability and has high oxygen reduction ability.

Means to Solve the Problem

In order to solve the above problems associated with the prior art, the present inventors have earnestly studied. As a result, they have found that a catalyst comprising a specific niobium oxycarbonitride is not corroded in an acidic electrolyte or at a high potential, is excellent in durability and has high oxygen reduction ability, and they have accomplished the present invention.

The present invention relates to, for example, the following (1) to (14).

(1)

A catalyst comprising a niobium oxycarbonitride.

(2)

The catalyst as stated in (1), wherein the niobium oxycarbonitride is represented by the composition formula $NbC_xN_yO_z$, wherein x, y and z represent a ratio of the numbers of atoms and are numbers satisfying the conditions of $0.01 \leq x \leq 2$, $0.01 \leq y \leq 2$, $0.01 \leq z \leq 3$ and $x+y+z \leq 5$.

(3)

The catalyst as stated in (1) or (2), wherein when the niobium oxycarbonitride is measured by X-ray powder diffractometry (Cu—Kα radiation), two or more diffraction peaks are observed between diffraction angles 2θ of 33° and 43°.

(4)

The catalyst as stated in any one of (1) to (3), having a BET specific surface area in the range of 1 to 1000 $m^2/g$.

(5)

The catalyst as stated in any one of (1) to (4), wherein the niobium oxycarbonitride is a mixture consisting of several phases, and when the niobium oxycarbonitride is measured by X-ray powder diffractometry (Cu-Kα radiation), a peak derived from $Nb_{12}O_{29}$ is observed.

(6)

A process for preparing the catalyst as stated in any one of (1) to (5), comprising a step of heat-treating niobium carbonitride in an inert gas containing oxygen gas to obtain a niobium oxycarbonitride.

(7)

The process for preparing the catalyst as stated in (6), wherein the inert gas further contains hydrogen gas.

(8)

The process for preparing the catalyst as stated in (6) or (7), further comprising a step of crushing the niobium carbonitride.

(9)

The preparation process as stated in any one of (6) to (8), wherein the temperature of the heat-treating is in the range of 400 to 1400° C.

(10)

The preparation process as stated in any one of (6) to (9), wherein the oxygen gas concentration in the inert gas is in the range of 0.1 to 10% by volume.

(11)

The preparation process as stated in anyone of (7) to (10), wherein the hydrogen gas concentration in the inert gas is not more than 5% by volume.

(12)

A catalyst layer for a fuel cell, comprising the catalyst as stated in any one of (1) to (5).

(13)

The catalyst layer for a fuel cell as stated in (12), further comprising electron conductive particles.

(14)

An electrode having a catalyst layer for a fuel cell and a porous support layer, wherein the catalyst layer for a fuel cell is the catalyst layer for a fuel cell as stated in (12) or (13).

(15)

A membrane electrode assembly having a cathode, an anode and an electrolyte membrane arranged between the cathode and the anode, wherein the cathode and/or the anode is the electrode as stated in (14).

(16)

A fuel cell having the membrane electrode assembly as stated in (15).

(17)

A solid polymer type fuel cell having the membrane electrode assembly as stated in (15).

Effect of the Invention

The catalyst of the present invention is not corroded in an acidic electrolyte or at a high potential, is stable, has high oxygen reduction ability and is inexpensive as compared with platinum. Therefore, a fuel cell having the catalyst is relatively inexpensive and exhibits excellent performance.

BEST MODE FOR CARRYING OUT THE INVENTION

Catalyst

Figure 1:
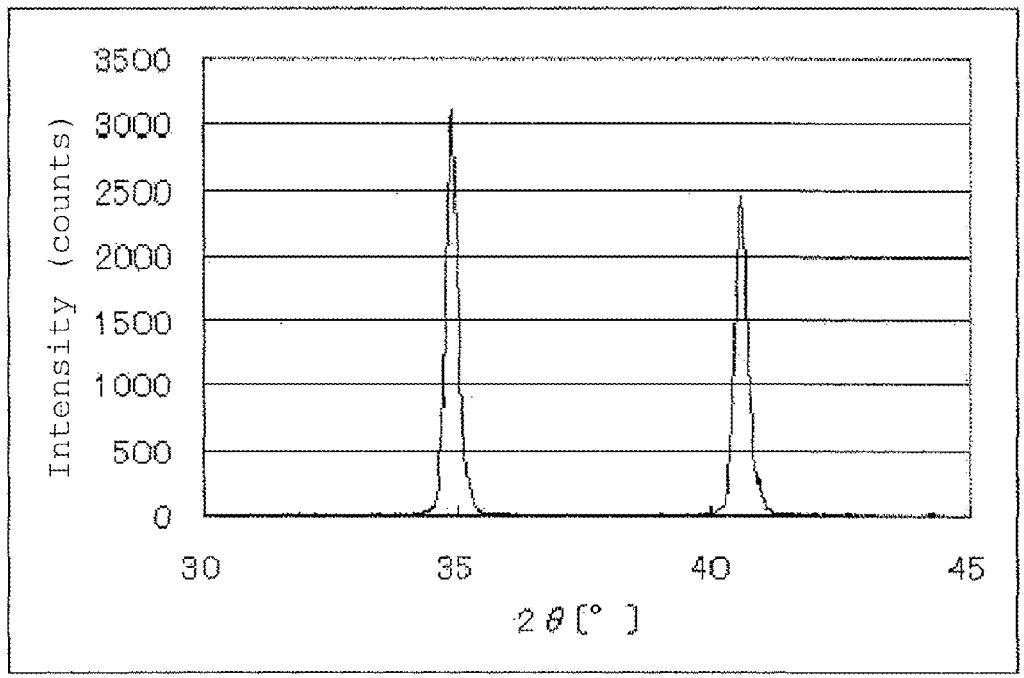
FIG. 1 is an X-ray powder diffraction spectrum of niobium carbonitride of Example 1.

The catalyst of the invention is characterized by comprising a niobium oxycarbonitride.

The niobium oxycarbonitride is usually represented by the composition formula $NbC_xN_yO_z$, wherein x, y and z represent a ratio of the numbers of atoms and are numbers satisfying the conditions of $0.01 \leq x \leq 2$, $0.01 \leq y \leq 2$, $0.01 \leq z \leq 3$ and $x+y+z \leq 5$. In the above composition formula, x, y and z are preferably numbers satisfying the conditions of $0.05 \leq x \leq 1$, $0.05 \leq y \leq 1$, $0.05 \leq z \leq 3$ and $1 \leq x+y+z \leq 5$.

In the present invention, the "niobium oxycarbonitride" means a compound represented by the composition formula $NbC_xN_yO_z$, or a mixture which contains a niobium oxide, a niobium carbide, a niobium nitride, a niobium carbonitride, a niobium oxycarbide, a niobium oxynitride or the like and is represented by the composition formula $NbC_xN_yO_z$ as a whole (however, a compound represented by $NbC_xN_yO_z$ may be contained or may not be contained), or both of them. When the niobium oxycarbonitride contains a niobium oxide of the above compounds, such as $Nb_{12}O_{29}$ having oxygen defects, an oxygen reduction potential of the resulting catalyst tends to be raised, so that the niobium oxide is preferable.

When the ratio of the numbers of atoms is in the above range, the oxygen reduction potential tends to be raised, so that such a range is preferable.

It is preferable that two or more diffraction peaks are observed between diffraction angles 2θ of 33° and 43° when the niobium oxycarbonitride is measured by X-ray powder diffractometry (Cu—Kα radiation).

The "diffraction peak" refers to a peak obtained at a specific diffraction angle and a specific diffraction intensity when a sample (crystalline material) is irradiated with X-rays at various angles. In the present invention, a signal which is detectable in a ratio (S/N) of signal (S) to noise (N) of not less than 2 is regarded as one diffraction peak. The noise (N) is taken as a width of a base line.

The X-ray diffractometry can be carried out by using, for example, an X-ray powder analysis apparatus Rigaku RAD-RX as the measuring device, and can be carried out under the measuring conditions of X-ray output (Cu—Kα) of 50 kV and 180 mA, a scanning axis of θ/2θ, a measuring range (2θ) of 10° to 89.98°, a measuring mode of FT, a reading width of 0.02°, a sampling time of 0.70 second, DS, SS and RS of 0.5°, 0.5° and 0.15 mm, respectively, and a goniometer radius of 185 mm.

The niobium oxycarbonitride is preferably a mixture consisting of several phases, and when the niobium oxycarbonitride is measured by X-ray powder diffractometry (Cu—Kα radiation), it is preferable that a peak derived from $Nb_{12}O_{29}$ is observed. In addition, peaks derived from oxides, such as $NbO$, $NbO_2$, $Nb_2O_5$, $Nb_{25}O_{62}$, $Nb_{47}O_{116}$ and $Nb_{22}O_{54}$, may be observed.

It is thought that a phase composed of an oxide such as $Nb_{12}O_{29}$ is present in the niobium oxycarbonitride. The present inventors have assumed that because of presence of such $Nb_{12}O_{29}$ having oxygen defects, etc., the catalyst finally obtained has high oxygen reduction ability.

Although the mechanism of appearance of oxygen reduction ability is not clear, it is assumed that units of $Nb_{12}O_{29}$ having oxygen defects overlap, and oxygen undergoes bridge coordination (Nb—O—O—Nb) between Nb and Nb, between the units, to bring about appearance of oxygen reduction ability. When units of $Nb_{12}O_{29}$ having oxygen defects overlap, the bond distance between Nb and Nb, between the units, is shortened. It is more preferable that the niobium oxycarbonitride has such a crystalline structure that the proportion of the portion wherein the bond distance is not more than 2 Å is not less than 15%. It is also assumed that by virtue of presence of carbon or nitrogen in this unit, electron density in the periphery of Nb varies and the catalytic activity is enhanced. Although it can be assumed that the electron conduction property is enhanced by the presence of carbon or nitrogen, the reason of the enhancement of such property is not clear.

The onset potential for oxygen reduction reaction of the catalyst for use in the invention, as measured in accordance with the following measuring method (A), is preferably not less than 0.5 V (vs. NHE) based on the reversible hydrogen electrode.

Measuring Method (A)

A catalyst and carbon (electron conductive particles) are placed in a solvent so that the catalyst dispersed in the carbon may become 1% by mass, and they are stirred with ultrasonic waves to obtain a suspension. As a carbon source, carbon black (specific surface area: 100 to 300 m²/g) (e.g., XC-72 available from Cabot Corporation) is used, and the catalyst is dispersed so that the mass ratio between the catalyst and carbon may become 95:5. As the solvents, isopropyl alcohol and water (iopropyl alcohol:water=2:1 by mass) are used.

30 μl of the suspension is withdrawn with applying ultrasonic waves, and it was rapidly dropped on a glassy carbon electrode (diameter: 5.2 mm) and dried at 120° C. for 1 hour. By the drying, a catalyst layer for a fuel cell, which contains the catalyst, is formed on the glassy carbon electrode.

Subsequently, 10 μl of a dilute solution obtained by diluting Nafion (DuPont 5% Nafion solution (DE521)) to 10 times with isopropyl alcohol is dropped on the catalyst layer for a fuel cell, and dried at 120° C. for 1 hour.

Using the electrode obtained as above, polarization is carried out at a potential scanning rate of 5 mV/sec in a sulfuric acid solution of 0.5 mol/dm³ at a temperature of 30° C. in an oxygen atmosphere and a nitrogen atmosphere to measure a current-potential curve, while a reversible hydrogen electrode in a sulfuric acid solution of the same concentration is used as a reference electrode, and in this measurement, a potential at which a difference of not less than 0.2 μA/cm² between the reduction current in the oxygen atmosphere and the reduction current in the nitrogen atmosphere starts to appear is regarded as an onset potential for oxygen reduction reaction.

If the onset potential for oxygen reduction reaction is less than 0.7 V (vs. NHE), hydrogen peroxide is sometimes produced when the above catalyst is used as a catalyst for a cathode of a fuel cell. In order to favorably reduce oxygen, the onset potential for oxygen reduction reaction is preferably not less than 0.85 V (vs. NHE). The onset potential for oxygen reduction reaction is preferably higher, and there is no upper limit specifically. is 1.23 V (vs. NHE) that is the theoretical upper limit.

It is preferable that the catalyst layer for a fuel cell of the invention formed by the use of the above catalyst is used at a potential of not less than 0.4 V (vs. NHE) in an acidic electrolyte. The upper limit of the potential is determined by stability of the electrode, and a potential up to about 1.23 V (vs. NHE) at which oxygen is generated is employable.

If the potential is less than 0.4 V (vs. NHE), oxygen cannot be favorably reduced and usefulness as a catalyst layer of a membrane electrode assembly contained in a fuel cell is poor, though there is no problem from the viewpoint of stability of the niobium oxycarbonitride.

The BET specific surface area of the catalyst is in the range of preferably 1 to 1000 m²/g, more preferably 10 to 100 m²/g. If the BET specific surface area is less than 1 m²/g, the catalyst area is small. If it is more than 100 m²/g, the catalyst is liable to be aggregated and is hard to handle.

The value of the BET specific surface area in the invention can be measured by a commercially available BET measuring device, and for example, it can be measured by Micromeritics Gemini 2360 manufactured by Shimadzu Corporation.

In order to enhance catalytic ability, the catalyst is desired to be a powder, as described later.

The particle diameter of the powder of the catalyst can be determined by the following formula (1) using a specific surface area which is determined by the BET method taking the particle of the powder as a sphere.

$$D = 6/\rho S \qquad (1)$$

D (μm): particle diameter of powder of electrode catalyst
ρ (g/cm³): specific gravity of powder of electrode catalyst S (m²/g): BET specific surface area of powder of electrode catalyst Process for Preparing Catalyst The process for preparing the catalyst is not specifically restricted, but for example, is a preparation process comprising a step of heat treating niobium carbonitride in an inert gas containing oxygen gas or an inert gas containing oxygen gas and hydrogen gas to obtain a niobium oxycarbonitride.

Examples of processes to obtain niobium carbonitride used in the above step include (I) a process comprising heat treating a mixture of a niobium oxide and carbon in a nitrogen atmosphere to prepare niobium carbonitride, (II) a process comprising heat treating a mixture of niobium carbide, niobium oxide and niobium nitride in a nitrogen atmosphere or the like to prepare niobium carbonitride, (III) a process comprising hydrolyzing a niobium salt or a niobium complex to obtain a niobium compound and then heat treating a mixture of the niobium compound and carbon in a nitrogen atmosphere to prepare niobium carbonitride and (IV) a process comprising heat treating a mixture of niobium carbide and niobium nitride in a nitrogen atmosphere or the like to prepare niobium carbonitride.

Preparation Process (I)

The preparation process (I) is a process comprising heat treating a mixture of a niobium oxide and carbon in a nitrogen atmosphere to prepare niobium carbonitride.

The temperature of the heat treatment in the preparation of niobium carbonitride is in the range of 600° C. to 1800° C., preferably 800 to 1600° C. When the heat treatment temperature is in the above range, crystalline properties and homogeneity are excellent, so that such a heat treatment temperature is preferable. If the heat treatment temperature is lower than 600° C., crystalline properties are poor, and homogeneity tends to become poor. If the heat treatment temperature is not lower than 1800° C., niobium carbonitride tends to be sintered.

Examples of the oxides of niobium as the raw materials include $NbO$, $NbO_2$ and $Nb_2O_5$. The niobium oxide as the raw material is not specifically restricted. Even if any niobium oxide is used, a catalyst comprising a niobium oxycarbonitride obtained by heat treating niobium carbonitride obtained from the oxide, in an inert gas containing oxygen gas or an inert gas containing oxygen gas and hydrogen gas has a high onset potential for oxygen reduction reaction and has activity.

Examples of carbons as the raw materials include carbon, carbon black, graphite, graphite, activated carbon, carbon nanotube, carbon nanofiber, carbon nanohorn and fullerene. When the particle diameter of a powder of carbon is decreased, the specific surface area is increased, and the reaction with the oxide is readily carried out, so that a smaller particle diameter is preferable. For example, carbon black (specific surface area: 100 to 300 m²/g, e.g., XC-72 available from Cabot Corporation) or the like is preferably used.

When the molar ratio between the niobium oxide and carbon as the raw materials is stoichiometrically controlled according to the valence of niobium such as a valence of divalent, tetravalent or pentavalent, proper niobium carbonitride is obtained. In the case of, for example, divalent niobium oxide, 1 to 3 mol of carbon is preferable based on 1 mol of the niobium oxide. In the case of tetravalent niobium oxide, 2 to 4 mol of carbon is preferable based on 1 mol of the niobium oxide. In the case of pentavalent niobium oxide, 3 to 9 mol of carbon is preferable based on 1 mol of the niobium oxide. If the molar ratio exceeds the upper limit of the above range, niobium carbide tends to be produced, and if the molar ratio is less than the lower limit, niobium nitride tends to be produced.

Preparation Process (II)

The preparation process (II) is a process comprising heat treating a mixture of niobium carbide, niobium oxide and niobium nitride in a nitrogen atmosphere or the like to prepare niobium carbonitride.

The temperature of the heat treatment in the preparation of niobium carbonitride is in the range of 600° C. to 1800° C., preferably 800 to 1600° C. When the heat treatment temperature is in the above range, crystalline properties and homogeneity are excellent, so that such a heat treatment temperature is preferable. If the heat treatment temperature is lower than 600° C., crystalline properties are poor, and homogeneity tends to become poor. If the heat treatment temperature is not lower than 1800° C., niobium carbonitride tends to be sintered.

As the raw materials, niobium carbide, niobium nitride and a niobium oxide are used.

Examples of the niobium oxides as the raw materials include $NbO$, $NbO_2$ and $Nb_2O_5$. The niobium oxide as the raw material is not specifically restricted. Even if any niobium oxide is used, a catalyst comprising a niobium oxycarbonitride obtained by heat treating niobium carbonitride obtained from the oxide, niobium carbide and niobium nitride, in an inert gas containing oxygen gas or an inert gas containing oxygen gas and hydrogen gas has a high onset potential for oxygen reduction reaction and has activity.

When the blending quantities (molar ratio) of niobium carbide, niobium oxide and niobium nitride are controlled, proper niobium carbonitride is obtained. The blending quantities (molar ratio) are as follows. It is usual that based on 1 mol of niobium nitride, the quantity of niobium carbide is in the range of 0.01 to 500 mol and the quantity of niobium oxide is in the range of 0.01 to 50 mol, and it is preferable that based on 1 mol of niobium nitride, the quantity of niobium carbide is in the range of 0.1 to 300 mol and the quantity of niobium oxide is in the range of 0.1 to 30 mol. When niobium carbonitride prepared in a blending molar ratio satisfying the above ranges is used, a niobium oxycarbonitride having a high onset potential for oxygen reduction reaction and having activity tends to be obtained.

Preparation Process (III)

The preparation process (III) is a process comprising hydrolyzing a niobium salt or a niobium complex to obtain a niobium compound and then heat treating a mixture of the niobium compound and carbon in a nitrogen atmosphere to prepare niobium carbonitride.

The preparation process (III) is described in detail hereinafter.

First, a niobium salt or a niobium complex is dissolved in a solvent. The resulting solution is adsorbed by carbon, and the solvent is removed, whereby the niobium salt or the niobium complex is deposited in a homogeneously dispersed state on the carbon surface. Next, the thus deposited niobium salt or niobium complex is hydrolyzed, whereby a niobium compound is obtained on the carbon surface. The mixture of the resulting niobium compound and carbon is heat treated in a nitrogen atmosphere, whereby niobium carbonitride is obtained. The niobium carbonitride obtained through such a preparation process tends to become finer particles.

Examples of the niobium salts and the niobium complexes include niobium alkoxide, niobium carboxylate, niobium halide and acetylacetonate complex of niobium. Of these, at least one niobium salt selected from niobium alkoxide, niobium carboxylate and niobium halide is preferably used because it is inexpensive and is readily hydrolyzed.

As the niobium alkoxide, a lower alkoxide, such as ethoxide, propoxide, isopropoxide, butoxide and isobutoxide, is preferable. As the niobium carboxylate, a lower fatty acid salt, such as acetate or propionate, is preferable. As the niobium halide, chloride is preferable.

The niobium compound obtained by hydrolyzing a niobium salt or the niobium complex is usually a niobium oxide having a hydroxyl group on the particle surface, and an alkoxy group, a carboxylic acid group or the like derived from the raw material may remain.

Examples of the solvents include ethanol, methanol and cellosolves. Examples of carbons include carbon black, graphite, graphite, activated carbon, carbon nanotube, carbon nanofiber, carbon nanohorn and fullerene.

Hydrolysis is a method wherein water is generally readily incorporated inside particles and defects are readily formed on particle surfaces. The present inventors have assumed that the niobium compound obtained by hydrolyzing the niobium salt or the niobium complex has oxygen defects formed on the particle surfaces, and therefore the catalyst finally obtained has high oxygen reduction ability.

The temperature of the heat treatment is in the range of 600° C. to 1800° C., preferably 800 to 1600° C. When the heat treatment temperature is in the above range, crystalline properties and homogeneity are excellent, so that such a heat treatment temperature is preferable. If the heat treatment temperature is lower than 600° C., crystalline properties are poor, and homogeneity tends to become poor. If the heat treatment temperature is not lower than 1800° C., niobium carbonitride tends to be sintered.

Preparation Process (IV)

The preparation process (IV) is a process comprising heat treating a mixture of niobium carbide and niobium nitride in a nitrogen atmosphere or the like to prepare niobium carbonitride.

The temperature of the heat treatment in the preparation of metal carbonitride is in the range of 600° C. to 1800° C., preferably 800 to 1600° C. When the heat treatment temperature is in the above range, crystalline properties and homogeneity are excellent, so that such a heat treatment temperature is preferable. If the heat treatment temperature is lower than 600° C., crystalline properties are poor, and homogeneity tends to become poor. If the heat treatment temperature is not lower than 1800° C., niobium carbonitride tends to be sintered.

As the raw materials, niobium carbide and niobium nitride are used.

The niobium carbide as the raw material is, for example, NbC.

The niobium nitride as the raw material is, for example, NbN.

The raw materials are not specifically restricted. Even if any raw material is used, a catalyst comprising a niobium oxycarbonitride obtained by heat treating niobium carbonitride obtained from niobium carbide and niobium nitride, in an inert gas containing oxygen gas or an inert gas containing oxygen gas and hydrogen gas has a high onset potential for oxygen reduction reaction and has activity.

When the blending quantities (molar ratio) of niobium carbide and niobium nitride are controlled, proper niobium carbonitride is obtained. The blending quantities (molar ratio) are as follows. It is usual that based on 1 mol of niobium nitride, the quantity of niobium carbide is in the range of 0.01 to 500 mol, and it is preferable that based on 1 mol of niobium nitride, the quantity of niobium carbide is in the range of 0.1 to 300 mol. When niobium carbonitride prepared in a blending molar ratio satisfying the above range is used, a niobium oxycarbonitride having a high onset potential for oxygen reduction reaction and having activity tends to be obtained.

Step of Crushing Niobium Carbonitride

It is preferable to crush the niobium carbonitride obtained by the above preparation process. By crushing it, the resulting catalyst can be made to be a more finely-divided powder, and the catalyst can be favorably dispersed in the catalyst layer containing a catalyst. Moreover, the resulting catalyst has a large catalyst area and is excellent in catalytic ability, so that such crushing is preferable.

Examples of methods to crush the niobium carbonitride include methods using a roll rolling mill, a ball mill, a medium stirring mill, an air flow crusher, a mortar and a bath crusher. From the viewpoint that niobium carbonitride can be formed into finer particles, the air flow crusher is preferable, and from the viewpoint that treatment of small quantities becomes easy, the method using a mortar is preferable.

Process for Preparing Niobium Oxycarbonitride

Next, a step of heat treating niobium carbonitride in an inert gas containing oxygen gas or an inert gas containing oxygen gas and hydrogen gas to obtain a niobium oxycarbonitride is described.

Examples of the inert gases include nitrogen gas, helium gas, neon gas, argon gas, krypton gas, xenon gas and radon gas. From the viewpoint of relatively easy availability, nitrogen gas, argon gas and helium gas are particularly preferable.

The oxygen gas concentration in the inert gas is in the range of preferably 0.1 to 10% by volume, particularly preferably 0.1 to 5% by volume, though it depends upon the heat treatment time and the heat treatment temperature. When the oxygen gas concentration is in the above range, a homogeneous oxycarbonitride is formed, so that such an oxygen gas concentration is preferable. If the oxygen gas concentration is less than 0.1% by volume, tends to be in an unoxidized state. If the oxygen gas concentration exceeds 10% by volume, oxidation tends to proceed excessively.

The inert gas may further contain hydrogen gas.

The hydrogen gas concentration in the inert gas is preferably not more than 10% by volume, particularly preferably not more than 5% by volume, though it depends upon the heat treatment time, the heat treatment temperature and the oxygen concentration. When the hydrogen gas concentration is in the above range, oxidation does not proceed excessively and a homogeneous oxycarbonitride is formed, so that such a hydrogen gas concentration is preferable.

The temperature of the heat treatment in this step is in the range of usually 400 to 1400° C., preferably 600 to 1200° C. When the heat treatment temperature is in the above range, a homogeneous oxycarbonitride is formed, so that such a heat treatment temperature is preferable. If the heat treatment temperature is lower than 400° C., there is a tendency for oxidation not to proceed. If the heat treatment temperature is not lower than 1400° C., oxidation proceeds, and crystal growth tends to take place.

Examples of heat treatment methods include static method, stirring method, dropping method and powder trapping method.

The dropping method is a method comprising heating an induction furnace to a given heat treatment temperature with flowing an inert gas containing a slight amount of oxygen gas or an inert gas containing oxygen gas and hydrogen gas into the furnace, keeping thermal equilibrium at the temperature, then dropping niobium carbonitride into a crucible that is a heating zone of the furnace and carrying out heat treatment. The dropping method is preferable from the viewpoint that aggregation and growth of niobium carbonitride particles can be reduced to the minimum.

The powder trapping method is a method comprising allowing a mist of niobium carbonitride to float in an inert gas atmosphere containing a slight amount of oxygen gas or an inert gas atmosphere containing oxygen gas and hydrogen gas, trapping the niobium carbonitride in a vertical tube furnace maintained at a given heat treatment temperature and carrying out heat treatment.

In the case of the dropping method, the heat treatment time of niobium carbonitride is in the range of usually 0.5 to 10 minutes, preferably 0.5 to 3 minutes. When the heat treatment time is in the above range, a homogeneous oxycarbonitride tends to be formed, so that such a heat treatment time is preferable. If the heat treatment time is less than 0.5 minute, an oxycarbonitride tends to be partially formed, and if the heat treatment time exceeds 10 minutes, oxidation tends to proceed excessively.

In the case of the powder trapping method, the heat treatment time of niobium carbonitride is in the range of usually 0.2 second to 1 minute, preferably 0.2 to 10 seconds. When the heat treatment time is in the above range, a homogeneous oxycarbonitride tends to be formed, so that such a heat treatment time is preferable. If the heat treatment time is less than 0.2 second, an oxycarbonitride tends to be partially formed, and if the heat treatment time exceeds 1 minute, oxidation tends to proceed excessively. When the method is carried out in a tube furnace, the heat treatment time of niobium carbonitride is in the range of usually 0.1 to 10 hours, preferably 0.5 to 5 hours. When the heat treatment time is in the above range, a homogeneous oxycarbonitride tends to be formed, so that such a heat treatment time is preferable. If the heat treatment time is less than 0.1 hour, an oxycarbonitride tends to be partially formed, and if the heat treatment time exceeds 10 hours, oxidation tends to proceed excessively.

As the catalyst of the invention, the niobium oxycarbonitride obtained by the above preparation process or the like may be used as it is, but a more finely divided powder obtained by further crushing the resulting niobium oxycarbonitride may be used.

Examples of methods to crush the niobium oxycarbonitride include methods using a roll rolling mill, a ball mill, a medium stirring mill, an air flow crusher, a mortar and a bath crushing machine. From the viewpoint that the niobium oxycarbonitride can be formed into finer particles, the air flow crusher is preferable, and from the viewpoint that treatment of small quantities becomes easy, the method using a mortar is preferable.

The catalyst of the invention is obtained by the above-mentioned process for preparing a niobium oxycarbonitride.

Uses

The catalyst of the invention can be used as a substitute catalyst for a platinum catalyst.

For example, the catalyst of the invention can be used as a catalyst for a fuel cell, a catalyst for exhaust gas treatment or a catalyst for organic synthesis.

The catalyst layer for a fuel cell of the invention is characterized by comprising the above catalyst.

As the catalyst layer for a fuel cell, there are an anode layer and a cathode layer, and the above catalyst can be used for any of these layers. Since the catalyst is excellent in durability and has high oxygen reduction ability, it is preferably used for the cathode catalyst layer.

The catalyst layer for a fuel cell of the invention preferably further contains an electron conductive powder. When the catalyst layer for a fuel cell, which comprises the above catalyst, further contains an electron conductive powder, the reduction current can be more increased. It is thought that electric contacts for inducing electrochemical reaction are formed in the catalyst by virtue of the electron conductive powder and therefore reduction current is increased.

The electron conductive particles are usually used as carriers of the catalyst.

Examples of the electron conductive particles include carbon, conductive polymers, conductive ceramics, metals, and conductive inorganic oxides, such as tungsten oxide and iridium oxide. These can be used singly or in combination. In particular, carbon alone or a mixture of carbon and other electron conductive particles is preferable because carbon has a large specific surface area. That is to say, the catalyst layer for a fuel cell preferably comprises the catalyst and carbon.

As the carbon, carbon black, graphite, graphite, activated carbon, carbon nanotube, carbon nanofiber, carbon nanohorn, fullerene or the like is employable. If the particle diameter of carbon is too small, an electron conduction path is hardly formed, and if it is too large, gas diffusion property of the catalyst layer for a fuel cell tends to be lowered or utilization of catalyst tends to be lowered. Therefore, the particle diameter of carbon is in the range of preferably 10 to 1000 nm, more preferably 10 to 100 nm.

When carbon is used as the electron conductive particles, the ratio by mass between the catalyst and the carbon (catalyst:electron conductive particles) is in the range of preferably 4:1 to 1000:1.

The conductive polymer is not specifically restricted, and examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferable, and polypyrrole is more preferable.

The polymer electrolyte is not specifically restricted as long as it is generally used in a catalyst layer for a fuel cell. Examples of the polymer electrolytes include a perfluorocarbon polymer having a sulfonic acid group (e.g., Nafion (DuPont 5% Nafion solution (DE521)), or the like), a hydrocarbon-based polymer compound having a sulfone acid group, a polymer compound doped with an inorganic acid such as phosphoric acid, an organic/inorganic hybrid polymer partially substituted with a proton conductive functional group, and a proton conductor wherein polymer matrix is impregnated with a phosphoric acid solution or a sulfuric acid solution. Of these, Nafion (DuPont 5% Nafion solution (DE521)) is preferable.

The catalyst layer for a fuel cell of the invention can be used as any of an anode catalyst layer and a cathode catalyst layer. Since the catalyst layer for a fuel cell of the invention has high oxygen reduction ability and comprises a catalyst that is hardly corroded even at a high potential in an acidic electrolyte, it is useful as a catalyst layer (catalyst layer for cathode) provided in a cathode of a fuel cell. The catalyst layer for a fuel cell of the invention is particularly preferably used as a catalyst layer provided in a cathode of a membrane electrode assembly provided in a solid polymer type fuel cell.

Examples of methods to disperse the catalyst onto the electron conductive particles that are carriers include air flow dispersion and dispersion in liquid medium. The dispersion in liquid medium is preferable because a dispersion of the catalyst and the electron conductive particles in a solvent can be used in the step for forming a catalyst layer for a fuel cell. Examples of the dispersion in liquid medium include a method using orifice contraction flow, a method using rotary shear flow and a method using ultrasonic waves. The solvent used in the dispersion in liquid medium is not specifically restricted as long as it does not corrode the catalyst and the electron conductive particles and can disperse them, and generally used is a volatile liquid organic solvent, water or the like.

When the catalyst is dispersed onto the electron conductive particles, the electrolyte and a dispersing agent may be dispersed at the same time.

The method to form the catalyst layer for a fuel cell is not specifically restricted, and is exemplified by a method comprising coating the later-described electrolyte membrane or gas diffusion layer with a suspension containing the catalyst, the electron conductive particles and the electrolyte. Examples of coating methods include dipping, screen printing, roll coating and spraying. Examples also include a method comprising forming a catalyst layer for a fuel cell on a substrate by coating method or filtration method using a suspension containing the catalyst, the electron conductive particles and the electrolyte and then forming a catalyst layer for a fuel cell on the electrolyte membrane by transfer method.

The electrode of the invention is characterized by having the catalyst layer for a fuel cell and a porous support layer.

The electrode of the invention can be used as any electrode of a cathode and an anode. Since the electrode of the invention is excellent in durability and has high catalytic ability, it exerts higher effect when it is used as a cathode.

The porous support layer is a layer which diffuses a gas (also referred to as a "gas diffusion layer" hereinafter). For the gas diffusion layer, any material may be used as long as it has electron conduction property and has high gas diffusion property and high corrosion resistance. Carbon-based porous materials, such as carbon paper and carbon cloth, are generally used, or for the purpose of weight lightening, stainless steel or an aluminum foil coated with an anti-corrosion material is generally used.

The membrane electrode assembly of the invention is a membrane electrode assembly having a cathode, an anode and an electrolyte membrane arranged between the cathode and the anode, and is characterized in that the cathode and/or the anode is the aforesaid electrode.

As the electrolyte membrane, for example, an electrolyte membrane using a perfluorosulfonic acid-based substance or a hydrocarbon-based electrolyte membrane is generally used. A membrane obtained by impregnating a microporous polymer membrane with a liquid electrolyte or a membrane obtained by filling a porous body with a polymer electrolyte may be used.

The fuel cell of the invention is characterized by having the above-mentioned membrane electrode assembly.

Electrode reaction of the fuel cell takes place on a so-called 3-phase interface (electrolyte-electrode catalyst-reaction gas). Fuel cells are classified into several types according to difference in electrolyte used, etc., and there are molten carbonate type (MCFC), phosphoric acid type (PAFC), solid oxide type (SOFC), solid polymer type (PEFC), etc. The membrane electrode assembly of the invention is preferably used for the solid polymer type fuel cell among them.

EXAMPLES

The present invention is further described with reference to the following examples, but it should be construed that the invention is in no way limited to those examples.

Various measurements in the examples and the comparative examples were carried out in the following manner.

Analytical Methods

1. X-Ray Powder Diffraction

Using Rotaflex manufactured by Rigaku Denki Co., Ltd., X-ray powder diffraction of a sample was carried out.

The number of diffraction peaks in the X-ray powder diffraction of each sample was counted by regarding a signal which is detectable in a ratio (S/N) of signal (S) to noise (N) of not less than 2, as one peak. The noise (N) is taken as a width of a base line.

2. Elemental Analysis

Carbon: About 0.1 g of a sample was weighed out and subjected to measurement with EMIA-110 manufactured by Horiba, Ltd.

Nitrogen, oxygen: About 0.1 g of a sample was weighed out, enclosed in Ni-Cup and subjected to measurement with an ON analytical device.

Niobium: About 0.1 g of a sample was weighed into a platinum dish, and to the sample was added nitric acid-hydrofluoric acid, followed by thermal decomposition. The thermal decomposition product was subjected to volumetric measurement, then diluted and determined by ICP-MS.

3. Measurement of BET Specific Surface Area

A BET specific surface area of the catalyst was measured by the use of Micromeritics Gemini 2360 manufactured by Shimadzu Corporation.

Example 1

1. Preparation of Catalyst 600 mg (50 mmol) of carbon (available from Cabot Corporation, Vulcan 72) was sufficiently pulverized and mixed with 2.50 g (20 mmol) of niobium(IV) oxide (NbO2). In a tube furnace, the mixed powder was heated at 1600° C. for 1 hour in a nitrogen atmosphere, whereby 1.89 g of niobium carbonitride was obtained.

An X-ray powder diffraction spectrum of the resulting niobium carbonitride is shown in FIG. 1. The results of elemental analysis of the resulting niobium carbonitride are set forth in Table 1.

In a tube furnace, 1.02 g of the resulting niobium carbonitride was heated at 800° C. for 1 hour with flowing argon gas containing oxygen gas of 1% by volume, whereby 1.10 g of a niobium oxycarbonitride (also referred to as a "catalyst (1)" hereinafter) was obtained.

Figure 10:
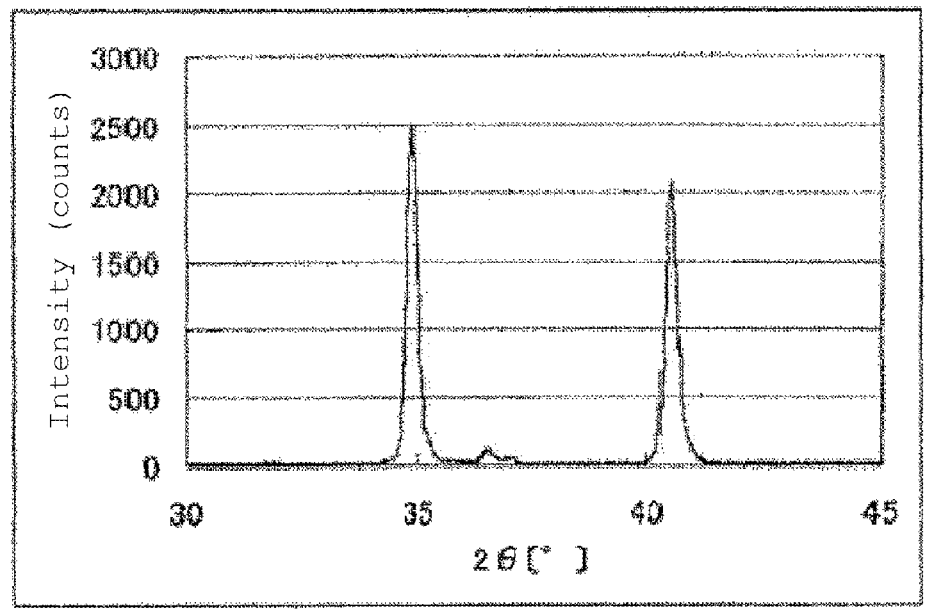
FIG. 10 is an X-ray powder diffraction spectrum of a catalyst (1) of Example 1.

An X-ray powder diffraction spectrum of the catalyst (1) is shown in FIG. 10. Between diffraction angles 2θ of 33° and 43°, 4 diffraction peaks were observed. The results of elemental analysis of the catalyst (1) are set forth in Table 2. The BET specific surface area of the catalyst (1) was 2.1 m$^2$/g.

2. Preparation of Electrode for Fuel Cell

Measurement of oxygen reduction ability was carried out in the following manner. 0.095 g of the catalyst (1) and 0.005 g of carbon (XC-72 available from Cabot Corporation) were introduced into 10 g of a mixed solution of isopropyl alcohol: pure water (2:1, by volume), and they were mixed by stirring and suspending with ultrasonic waves. Then, 30 μl of the mixture was applied to a glassy carbon electrode (available from Tokai Carbon Co., Ltd., diameter: 5.2 mm) and dried at 120° C. for 1 hour. Further, 10 μl of a dilute solution obtained by diluting Nafion (DuPont 5% Nafion solution (DE521)) to 10 times with isopropyl alcohol was applied and dried at 120° C. for 1 hour to obtain an electrode (1) for a fuel cell.

3. Evaluation of Oxygen Reduction Ability

Catalytic ability (oxygen reduction ability) of the electrode (1) for a fuel cell prepared as above was evaluated in the following manner.

First, the electrode (1) for a fuel cell prepared was subjected to polarization at a potential scanning rate of 5 mV/sec in a sulfuric acid solution of 0.5 mol/dm$^3$ at 30° C. in an oxygen atmosphere and a nitrogen atmosphere, to measure a current-potential curve. In this measurement, a reversible hydrogen electrode in a sulfuric acid solution of the same concentration was used as a reference electrode.

From the result of the above measurement, a potential at which a difference of not less than 0.2 μA/cm$^2$ between the reduction current in the oxygen atmosphere and the reduction current in the nitrogen atmosphere starts to appear was regarded as an onset potential for oxygen reduction reaction, and the difference between them was regarded as an oxygen reduction current.

The catalytic ability (oxygen reduction ability) of the electrode (1) for a fuel cell prepared was evaluated by the onset potential for oxygen reduction reaction and the oxygen reduction current.

That is to say, a higher onset potential for oxygen reduction reaction or a higher oxygen reduction current indicates that the catalytic ability (oxygen reduction ability) of the electrode (1) for a fuel cell is higher.

Figure 25:
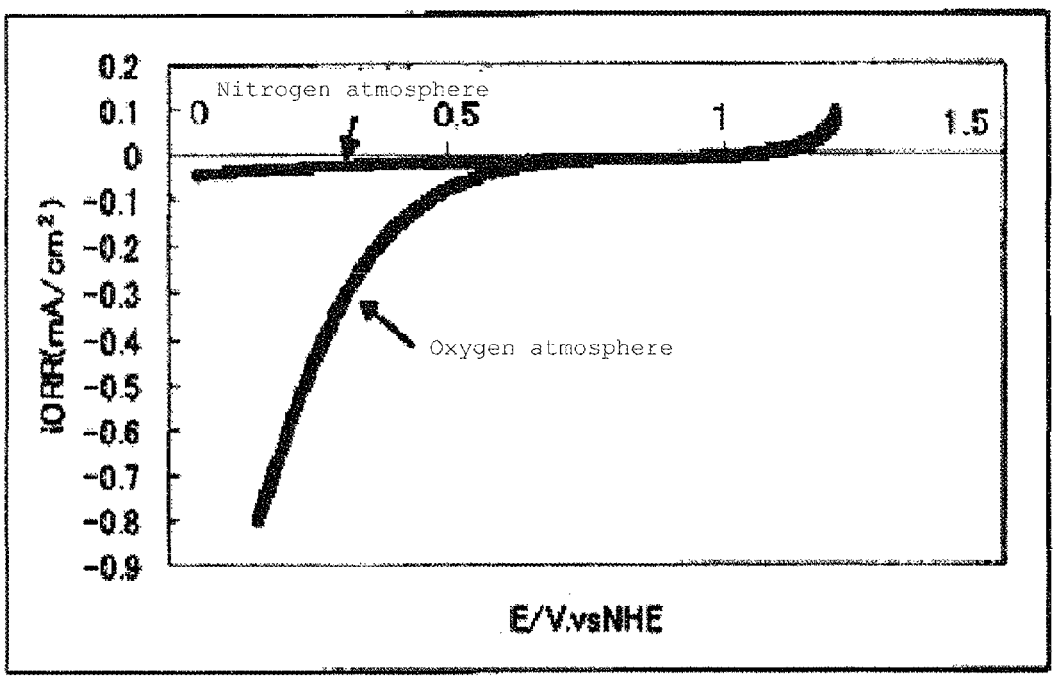
FIG. 25 is a graph evaluating oxygen reduction ability of an electrode (1) for a fuel cell of Example 1.

A current-potential curve obtained by the above measurement is shown in FIG. 25.

The electrode (1) for a fuel cell prepared in Example 1 had an onset potential for oxygen reduction reaction of 0.85 V (vs. NHE) and proved to have high oxygen reduction ability.

Example 2

1. Preparation of Catalyst 1.83 g of niobium carbonitride was prepared and from 1.02 g of the niobium carbonitride 1.09 g of a niobium oxycarbonitride (also referred to as a "catalyst (2)" hereinafter) was prepared in the same manner as in Example 1, except that the amount of carbon was changed to 480 mg (40 mmol) from 600 mg.

Figure 2:
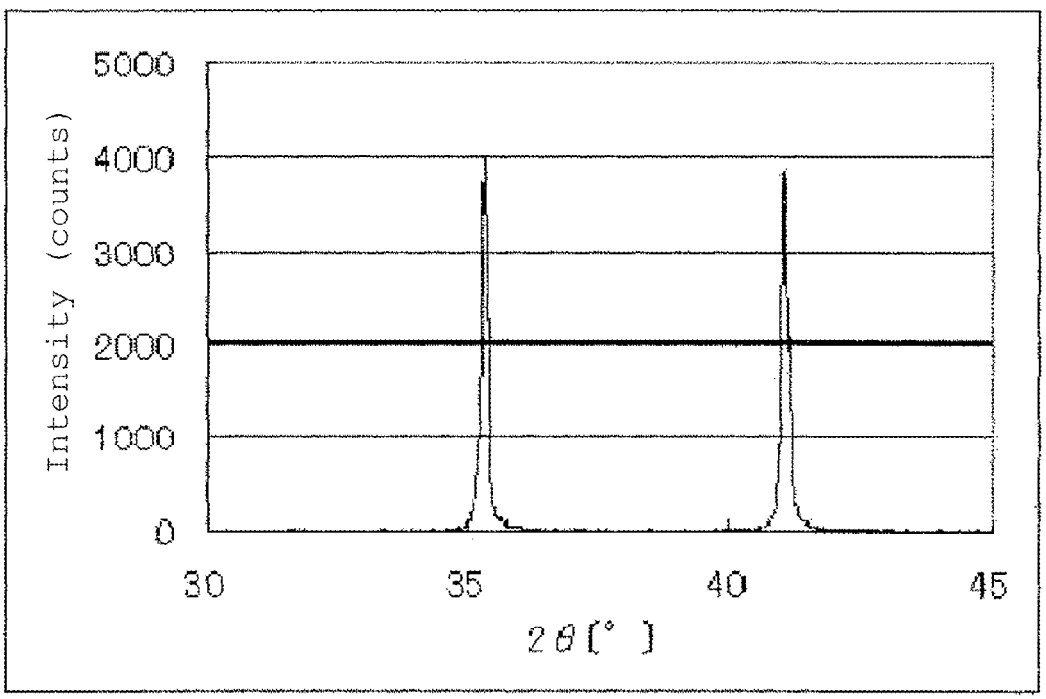
FIG. 2 is an X-ray powder diffraction spectrum of niobium carbonitride of Example 2.

An X-ray powder diffraction spectrum of the resulting niobium carbonitride is shown in FIG. 2. The results of elemental analysis of the resulting niobium carbonitride are set forth in Table 1.

Figure 11:
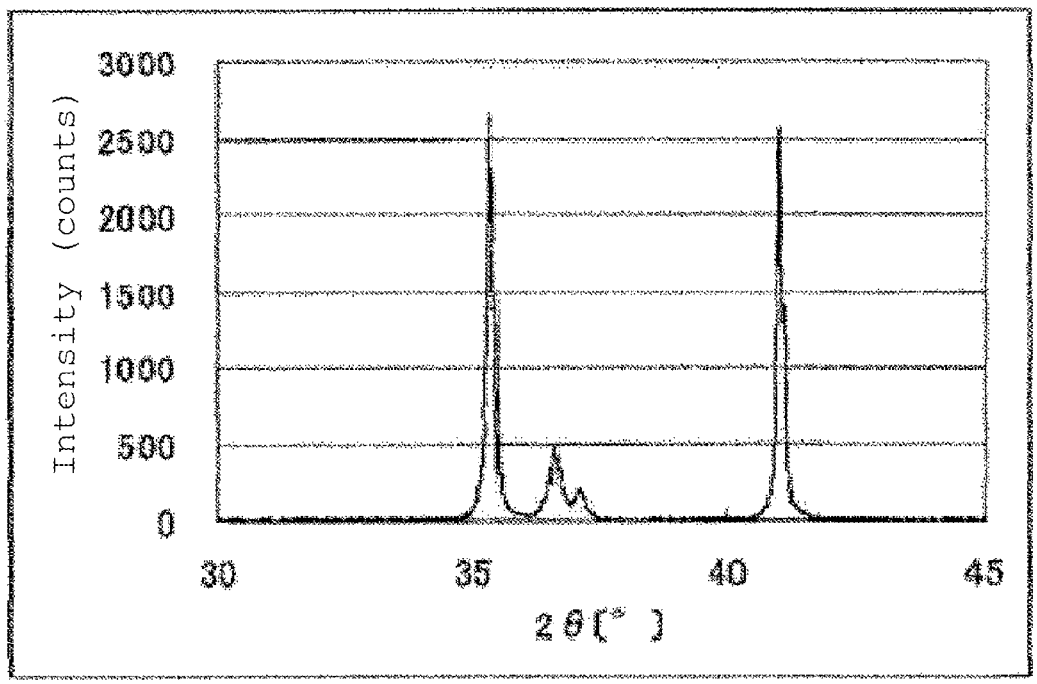
FIG. 11 is an X-ray powder diffraction spectrum of a catalyst (2) of Example 2.

An X-ray powder diffraction spectrum of the catalyst (2) is shown in FIG. 11. Between diffraction angles 2θ of 33° and 43°, 4 diffraction peaks were observed. The results of elemental analysis of the catalyst (2) are set forth in Table 2. The BET specific surface area of the catalyst (2) was 2.3 m$^2$/g.

2. Preparation of Electrode for Fuel Cell

An electrode (2) for a fuel cell was obtained in the same manner as in Example 1, except that the catalyst (2) was used.

3. Evaluation of Oxygen Reduction Ability

Catalytic ability (oxygen reduction ability) was evaluated in the same manner as in Example 1, except that the electrode (2) for a fuel cell was used.

The electrode (2) for a fuel cell prepared in Example 2 had an onset potential for oxygen reduction reaction of 0.75 V (vs. NHE) and proved to have high oxygen reduction ability.

Example 3

1. Preparation of Catalyst 2.19 g of niobium carbonitride was prepared and from 1.02 g of the niobium carbonitride 1.09 g of a niobium oxycarbonitride (also referred to as a "catalyst (3)" hereinafter) was prepared in the same manner as in Example 1, except that the amount of carbon was changed to 720 mg (60 mmol) from 600 mg.

Figure 3:
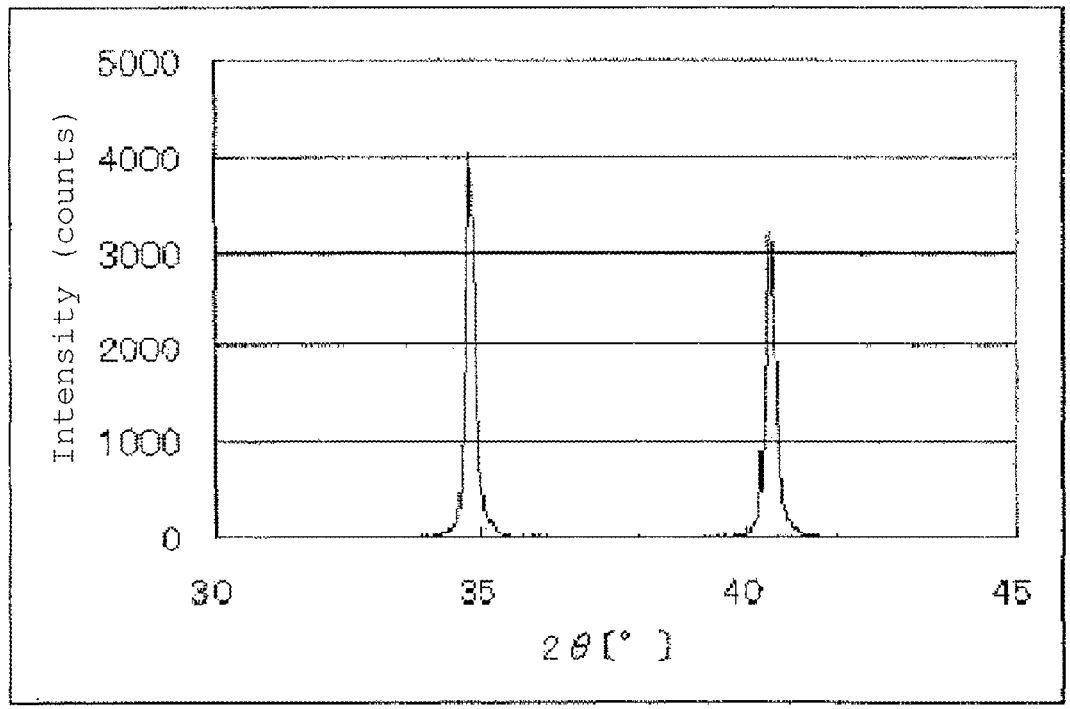
FIG. 3 is an X-ray powder diffraction spectrum of niobium carbonitride of Example 3.

An X-ray powder diffraction spectrum of the resulting niobium carbonitride is shown in FIG. 3. The results of elemental analysis of the resulting niobium carbonitride are set forth in Table 1.

Figure 12:
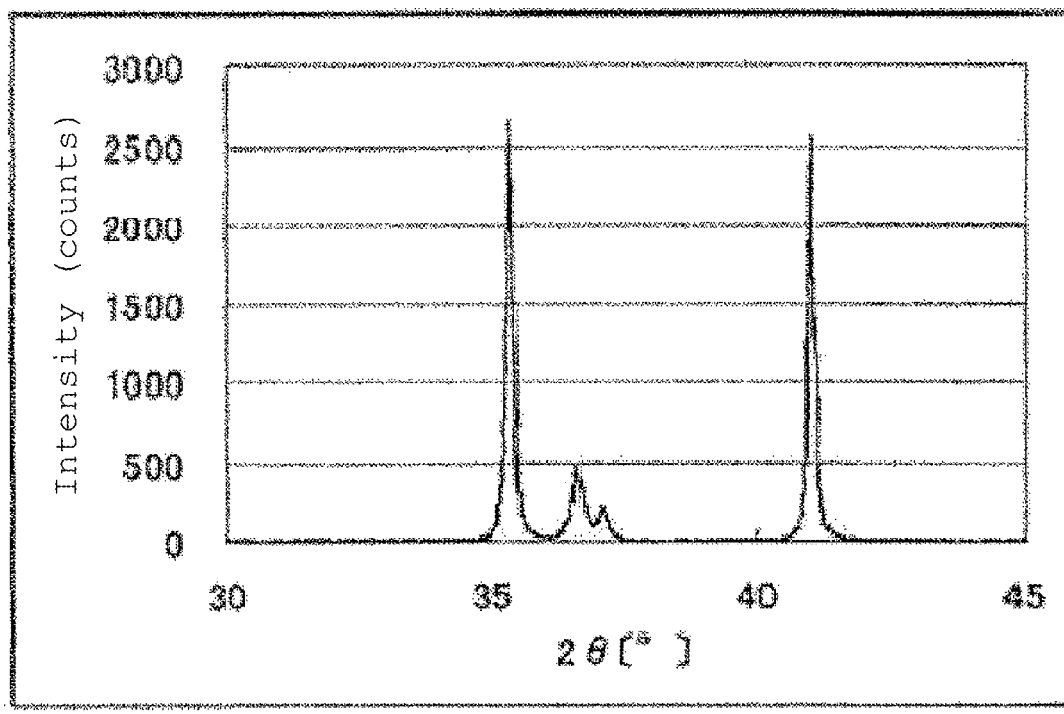
FIG. 12 is an X-ray powder diffraction spectrum of a catalyst (3) of Example 3.

An X-ray powder diffraction spectrum of the catalyst (3) is shown in FIG. 12. Between diffraction angles 2θ of 33° and 43°, 4 diffraction peaks were observed. The results of elemental analysis of the catalyst (3) are set forth in Table 2. The BET specific surface area of the catalyst (3) was 2.1 m$^2$/g.

2. Preparation of Electrode for Fuel Cell

An electrode (3) for a fuel cell was obtained in the same manner as in Example 1, except that the catalyst (3) was used.

3. Evaluation of Oxygen Reduction Ability

Catalytic ability (oxygen reduction ability) was evaluated in the same manner as in Example 1, except that the electrode (3) for a fuel cell was used.

The electrode (3) for a fuel cell prepared in Example 3 had an onset potential for oxygen reduction reaction of 0.72 V (vs. NHE) and proved to have high oxygen reduction ability.

Example 4

1. Preparation of Catalyst 1.95 g of niobium carbonitride was prepared and from 1.01 g of the niobium carbonitride 1.08 g of a niobium oxycarbonitride (also referred to as a "catalyst (4)" hereinafter) was prepared in the same manner as in Example 1, except that 2.18 g (20 mmol) of divalent niobium oxide was used instead of 2.50 g (20 mmol) of tetravalent niobium oxide and the amount of carbon was changed to 360 mg (30 mmol) from 600 mg.

Figure 4:
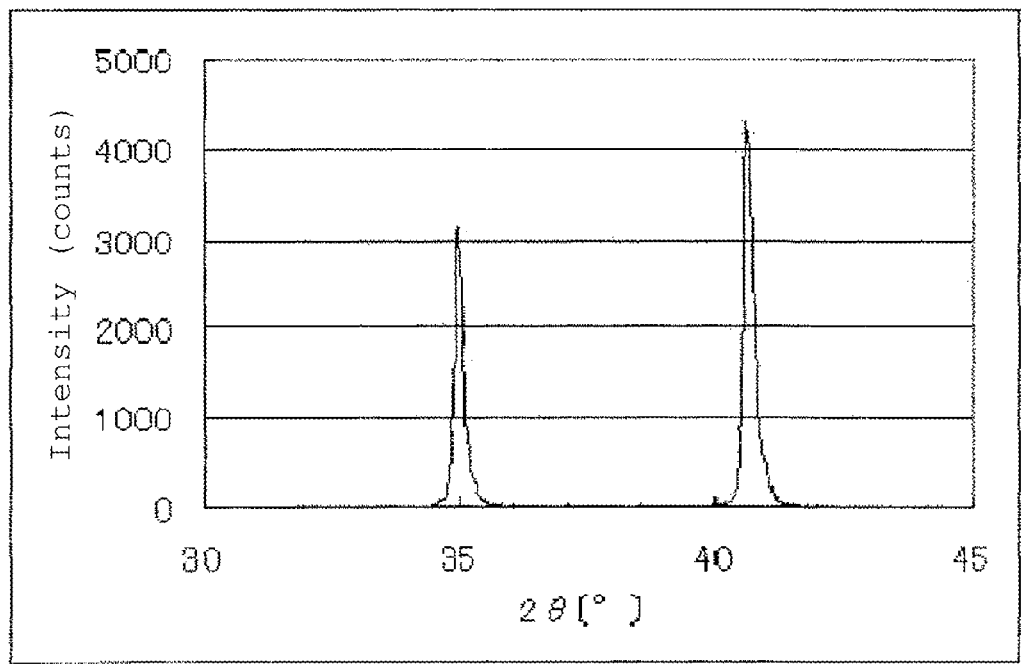
FIG. 4 is an X-ray powder diffraction spectrum of niobium carbonitride of Example 4.

An X-ray powder diffraction spectrum of the resulting niobium carbonitride is shown in FIG. 4. The results of elemental analysis of the resulting niobium carbonitride are set forth in Table 1.

Figure 13:
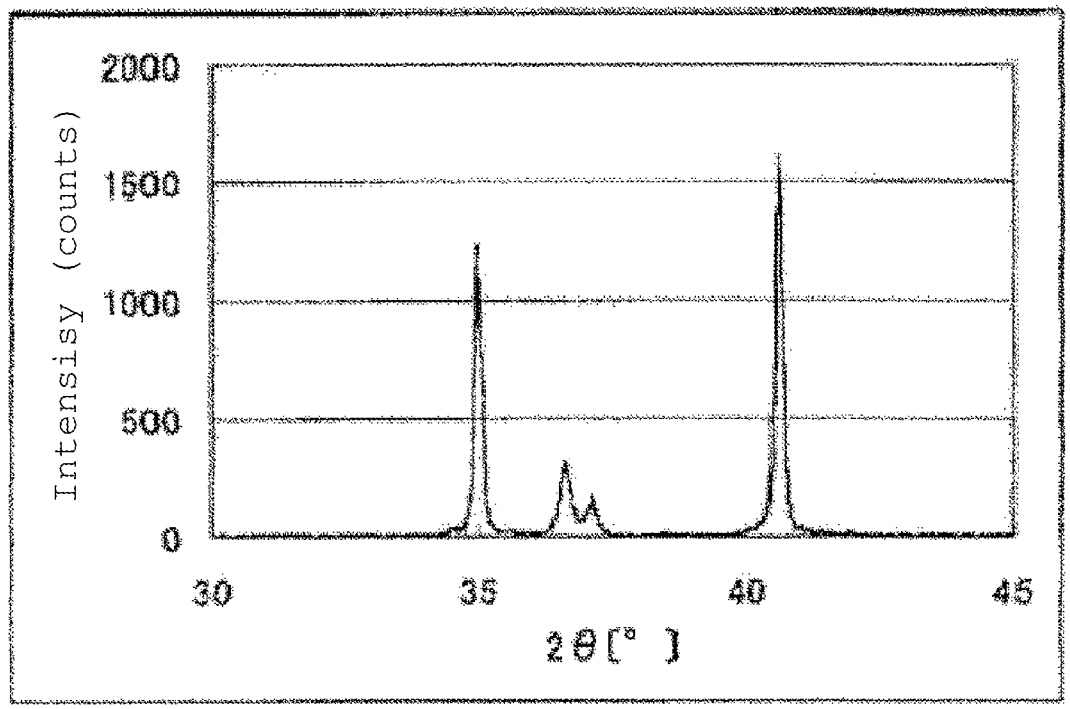
FIG. 13 is an X-ray powder diffraction spectrum of a catalyst (4) of Example 4.

An X-ray powder diffraction spectrum of the catalyst (4) is shown in FIG. 13. Between diffraction angles 2θ of 33° and 43°, 4 diffraction peaks were observed. The results of elemental analysis of the catalyst (4) are set forth in Table 2. The BET specific surface area of the catalyst (4) was 2.2 m$^2$/g.

2. Preparation of Electrode for Fuel Cell

An electrode (4) for a fuel cell was obtained in the same manner as in Example 1, except that the catalyst (4) was used.

3. Evaluation of Oxygen Reduction Ability

Catalytic ability (oxygen reduction ability) was evaluated in the same manner as in Example 1, except that the electrode (4) for a fuel cell was used.

The electrode (4) for a fuel cell prepared in Example 4 had an onset potential for oxygen reduction reaction of 0.68 V (vs. NHE) and proved to have high oxygen reduction ability.

Example 5

1. Preparation of Catalyst 1.84 g of niobium carbonitride was prepared and from 1.00 g of the niobium carbonitride 1.07 g of a niobium oxycarbonitride (also referred to as a "catalyst (5)" hereinafter) was prepared in the same manner as in Example 4, except that the amount of carbon was changed to 480 mg (40 mmol) from 360 mg.

Figure 5:
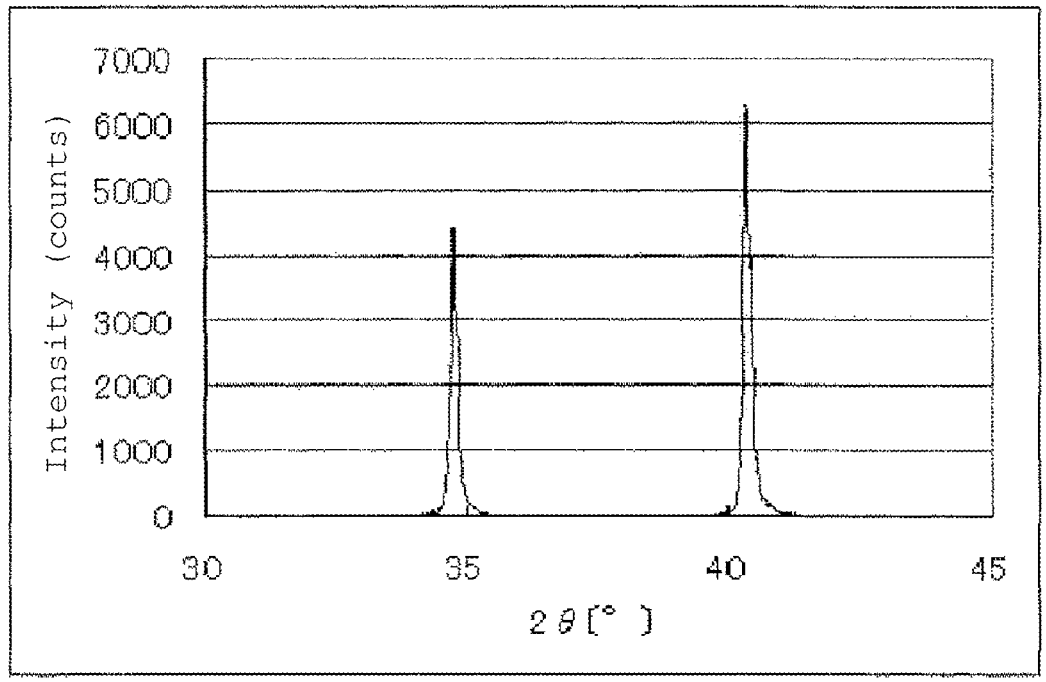
FIG. 5 is an X-ray powder diffraction spectrum of niobium carbonitride of Example 5.

An X-ray powder diffraction spectrum of the resulting niobium carbonitride is shown in FIG. 5. The results of elemental analysis of the resulting niobium carbonitride are set forth in Table 1.

Figure 14:
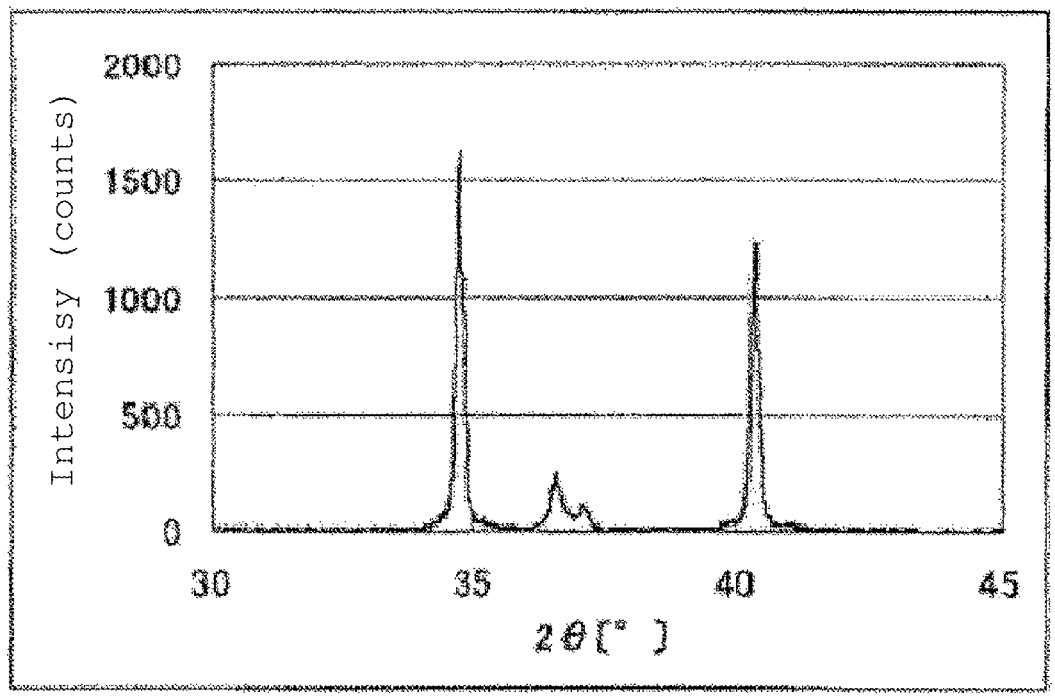
FIG. 14 is an X-ray powder diffraction spectrum of a catalyst (5) of Example 5.

An X-ray powder diffraction spectrum of the catalyst (5) is shown in FIG. 14. Between diffraction angles 2θ of 33° and 43°, 4 diffraction peaks were observed. The results of elemental analysis of the catalyst (5) are set forth in Table 2. The BET specific surface area of the catalyst (5) was 2.2 m$^2$/g.

2. Preparation of Electrode for Fuel Cell

An electrode (5) for a fuel cell was obtained in the same manner as in Example 1, except that the catalyst (5) was used.

3. Evaluation of Oxygen Reduction Ability

Catalytic ability (oxygen reduction ability) was evaluated in the same manner as in Example 1, except that the electrode (5) for a fuel cell was used.

The electrode (5) for a fuel cell prepared in Example 5 had an onset potential for oxygen reduction reaction of 0.65 V (vs. NHE) and proved to have high oxygen reduction ability.

Example 6

1. Preparation of Catalyst 2.39 g of niobium carbonitride was prepared and from 1.00 g of the niobium carbonitride 1.07 g of a niobium oxycarbonitride (also referred to as a "catalyst (6)" hereinafter) was prepared in the same manner as in Example 1, except that 2.65 g (10 mmol) of pentavalent niobium oxide was used instead of 2.50 g (20 mmol) of tetravalent niobium oxide and the amount of carbon was changed to 540 mg (45 mmol) from 600 mg.

Figure 6:
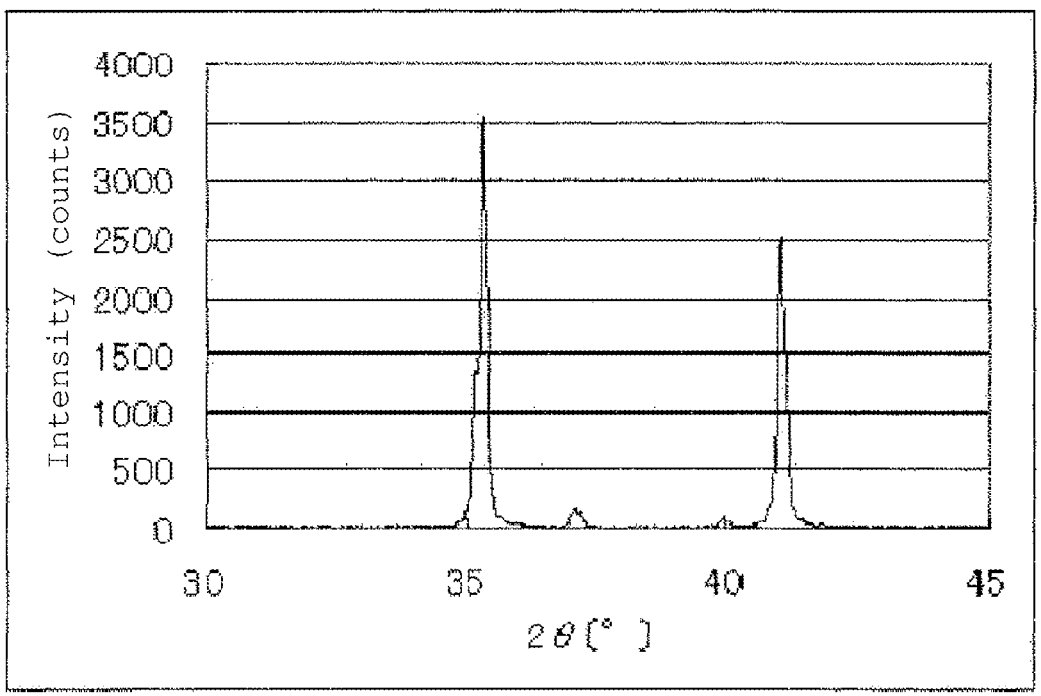
FIG. 6 is an X-ray powder diffraction spectrum of niobium carbonitride of Example 6.

An X-ray powder diffraction spectrum of the resulting niobium carbonitride is shown in FIG. 6. The results of elemental analysis of the resulting niobium carbonitride are set forth in Table 1.

Figure 15:
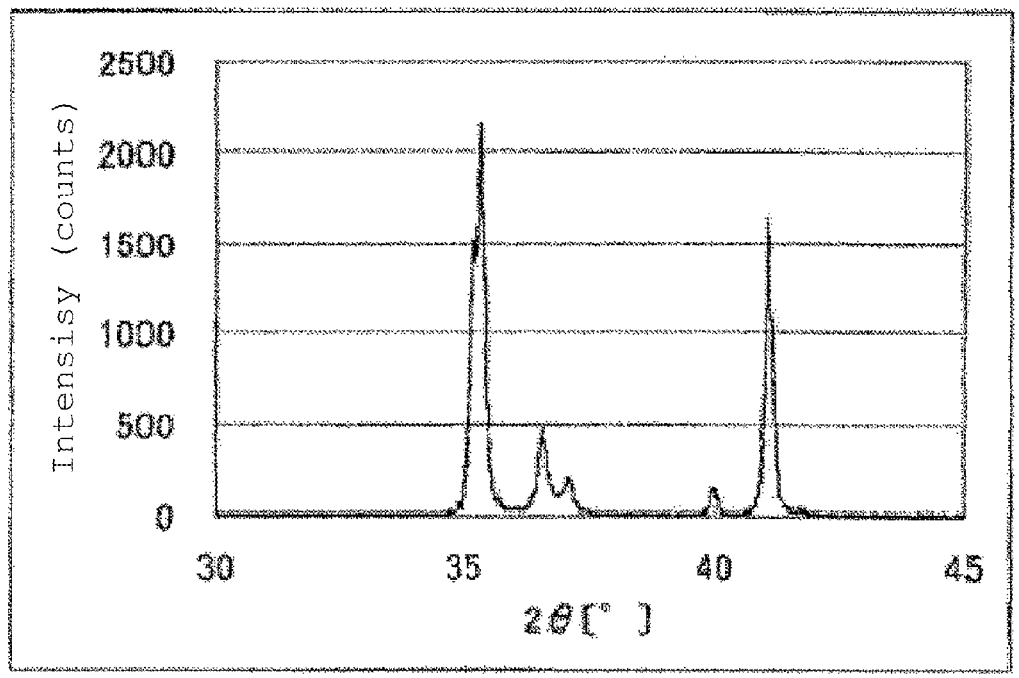
FIG. 15 is an X-ray powder diffraction spectrum of a catalyst (6) of Example 6.

An X-ray powder diffraction spectrum of the catalyst (6) is shown in FIG. 15. Between diffraction angles 2θ of 33° and 43°, 5 diffraction peaks were observed. The results of elemental analysis of the catalyst (6) are set forth in Table 2. The BET specific surface area of the catalyst (6) was 2.2 m$^2$/g.

2. Preparation of Electrode for Fuel Cell

An electrode (6) for a fuel cell was obtained in the same manner as in Example 1, except that the catalyst (6) was used.

3. Evaluation of Oxygen Reduction Ability

Catalytic ability (oxygen reduction ability) was evaluated in the same manner as in Example 1, except that the electrode (6) for a fuel cell was used.

The electrode (6) for a fuel cell prepared in Example 6 had an onset potential for oxygen reduction reaction of 0.66 V (vs. NHE) and proved to have high oxygen reduction ability.

Example 7

1. Preparation of catalyst 2.30 g of niobium carbonitride was prepared and from 1.01 g of the niobium carbonitride 1.07 g of a niobium oxycarbonitride (also referred to as a "catalyst (7)" hereinafter) was prepared in the same manner as in Example 1, except that 2.65 g (10 mmol) of pentavalent niobium oxide was used instead of 2.50 g (20 mmol) of tetravalent niobium oxide and the amount of carbon was changed to 840 mg (70 mmol) from 600 mg.

Figure 7:
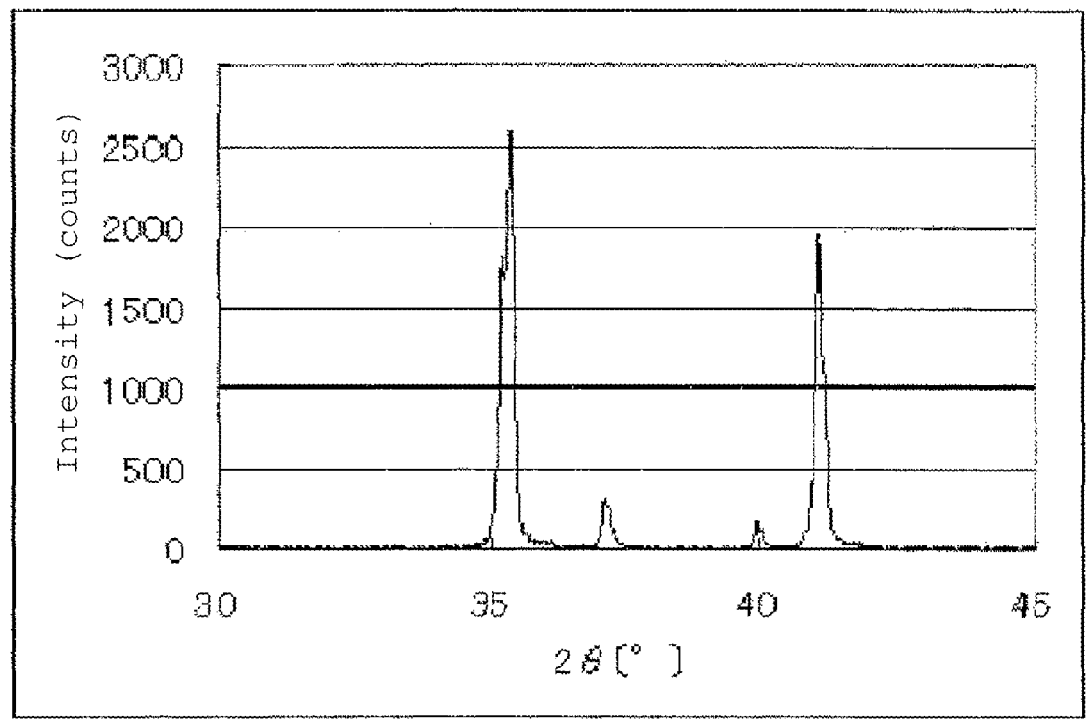
FIG. 7 is an X-ray powder diffraction spectrum of niobium carbonitride of Example 7.

An X-ray powder diffraction spectrum of the resulting niobium carbonitride is shown in FIG. 7. The results of elemental analysis of the resulting niobium carbonitride are set forth in Table 1.

Figure 16:
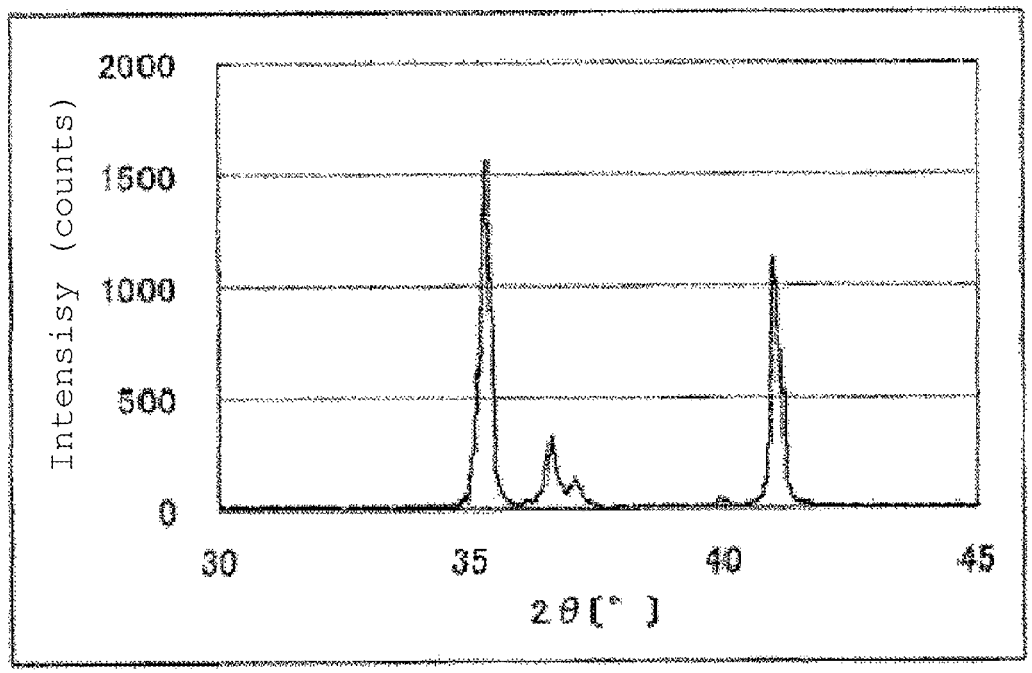
FIG. 16 is an X-ray powder diffraction spectrum of a catalyst (7) of Example 7.

An X-ray powder diffraction spectrum of the catalyst (7) is shown in FIG. 16. Between diffraction angles 2θ of 33° and 43°, 5 diffraction peaks were observed. The results of elemental analysis of the catalyst (7) are set forth in Table 2. The BET specific surface area of the catalyst (7) was 2.3 m$^2$/g.

2. Preparation of Electrode for Fuel Cell

An electrode (7) for a fuel cell was obtained in the same manner as in Example 1, except that the catalyst (7) was used.

3. Evaluation of Oxygen Reduction Ability

Catalytic ability (oxygen reduction ability) was evaluated in the same manner as in Example 1, except that the electrode (7) for a fuel cell was used.

Figure 26:
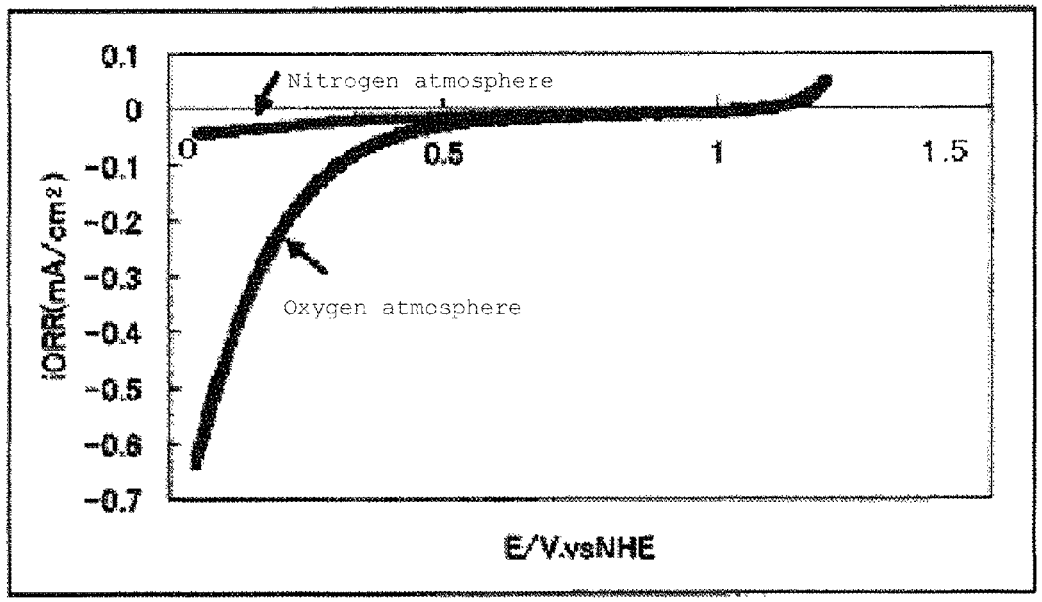
FIG. 26 is a graph evaluating oxygen reduction ability of an electrode (7) for a fuel cell of Example 7.

A current-potential curve obtained by the measurement is shown in FIG. 26.

The electrode (7) for a fuel cell prepared in Example 7 had an onset potential for oxygen reduction reaction of 0.82 V (vs. NHE) and proved to have high oxygen reduction ability.

Example 8

1. Preparation of Catalyst 8.92 g (85 mmol) of niobium carbide, 1.25 g (10 mmol) of niobium oxide and 0.54 g (5 mmol) of niobium nitride were well mixed and heated at 1600° C. for 3 hours in a nitrogen atmosphere, whereby 10.40 g of niobium carbonitride was obtained. Since the niobium carbonitride was a sintered body, it was crushed by a ball mill.

Figure 8:
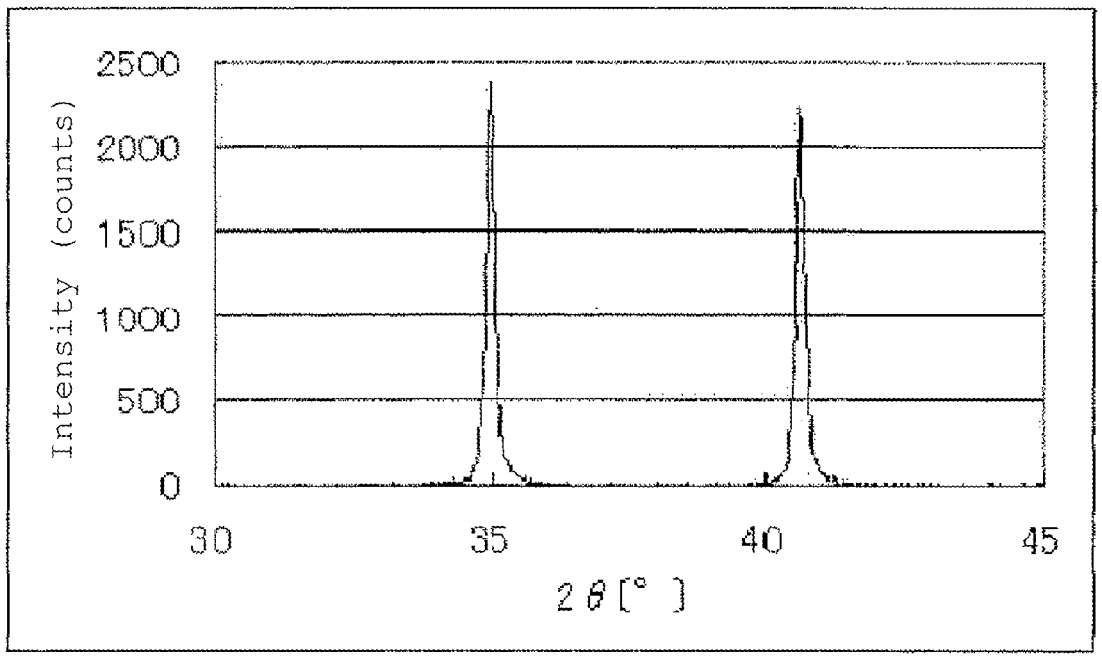
FIG. 8 is an X-ray powder diffraction spectrum of niobium carbonitride of Example 8.

An X-ray powder diffraction spectrum of the resulting niobium carbonitride is shown in FIG. 8. The results of elemental analysis of the resulting niobium carbonitride are set forth in Table 1.

In a tube furnace, 1.05 g of the resulting niobium carbonitride was heated at 800° C. for 1 hour with flowing argon gas containing oxygen gas of 1% by volume, whereby 1.12 g of a niobium oxycarbonitride (also referred to as a "catalyst (8)" hereinafter) was obtained.

Figure 17:
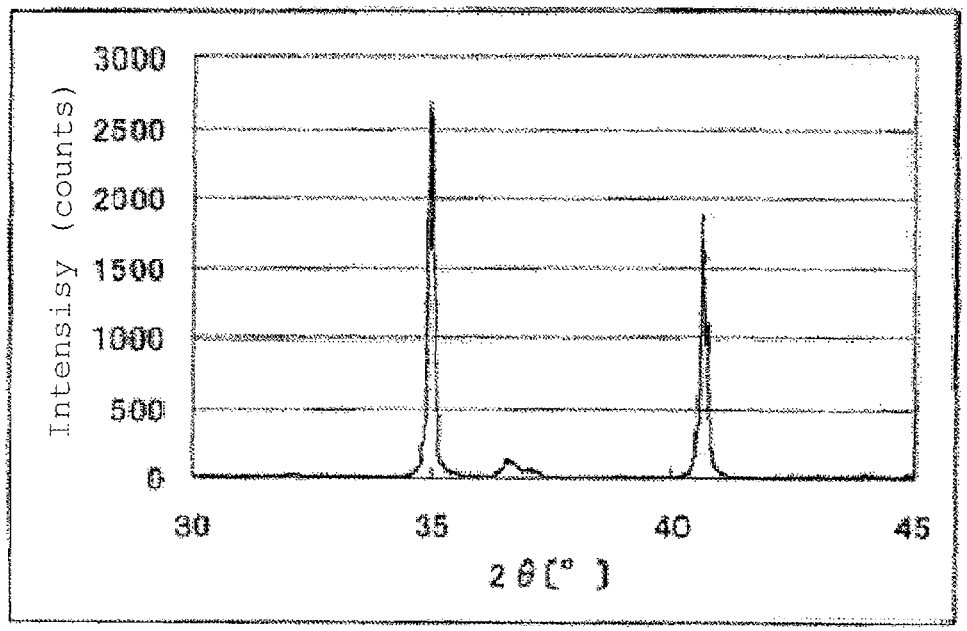
FIG. 17 is an X-ray powder diffraction spectrum of a catalyst (8) of Example 8.

An X-ray powder diffraction spectrum of the catalyst (8) is shown in FIG. 17. Between diffraction angles 2θ of 33° and 43°, 4 diffraction peaks were observed. The results of elemental analysis of the catalyst (8) are set forth in Table 2. The BET specific surface area of the catalyst (8) was 2.1 m$^2$/g.

2. Preparation of Electrode for Fuel Cell

An electrode (8) for a fuel cell was obtained in the same manner as in Example 1, except that the catalyst (8) was used.

3. Evaluation of Oxygen Reduction Ability

Catalytic ability (oxygen reduction ability) was evaluated in the same manner as in Example 1, except that the electrode (8) for a fuel cell was used.

Figure 27:
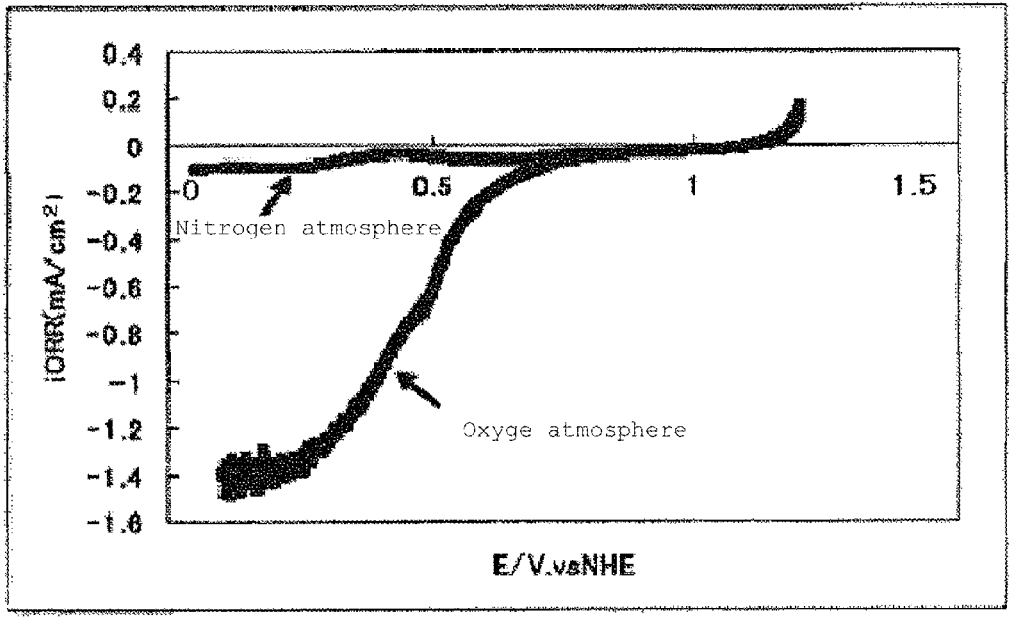
FIG. 27 is a graph evaluating oxygen reduction ability of an electrode (8) for a fuel cell of Example 8.

A current-potential curve obtained by the measurement is shown in FIG. 27.

The electrode (8) for a fuel cell prepared in Example 8 had an onset potential for oxygen reduction reaction of 0.88 V (vs. NHE) and proved to have high oxygen reduction ability.

Comparative Example 1

1. Preparation of Catalyst 8.92 g (85 mmol) of niobium carbide, 1.25 g (10 mmol) of niobium oxide and 0.54 g (5 mmol) of niobium nitride were well mixed and heat treated at 1500° C. for 3 hours in a nitrogen atmosphere, whereby 10.50 g of niobium carbonitride (also referred to as a "catalyst (9) hereinafter") being a sintered body was obtained. Since the niobium carbonitride was a sintered body, it was crushed by a ball mill. The results of elemental analysis of the catalyst (9) thus crushed are set forth in Table 2. The BET specific surface area of the catalyst (9) was 0.8 $m^2/g$.

2. Preparation of Electrode for Fuel Cell

An electrode (9) for a fuel cell was obtained in the same manner as in Example 1, except that the resulting niobium carbonitride was used.

3. Evaluation of Oxygen Reduction Ability

Catalytic ability (oxygen reduction ability) was evaluated in the same manner as in Example 1, except that the electrode (9) for a fuel cell was used.

Figure 28:
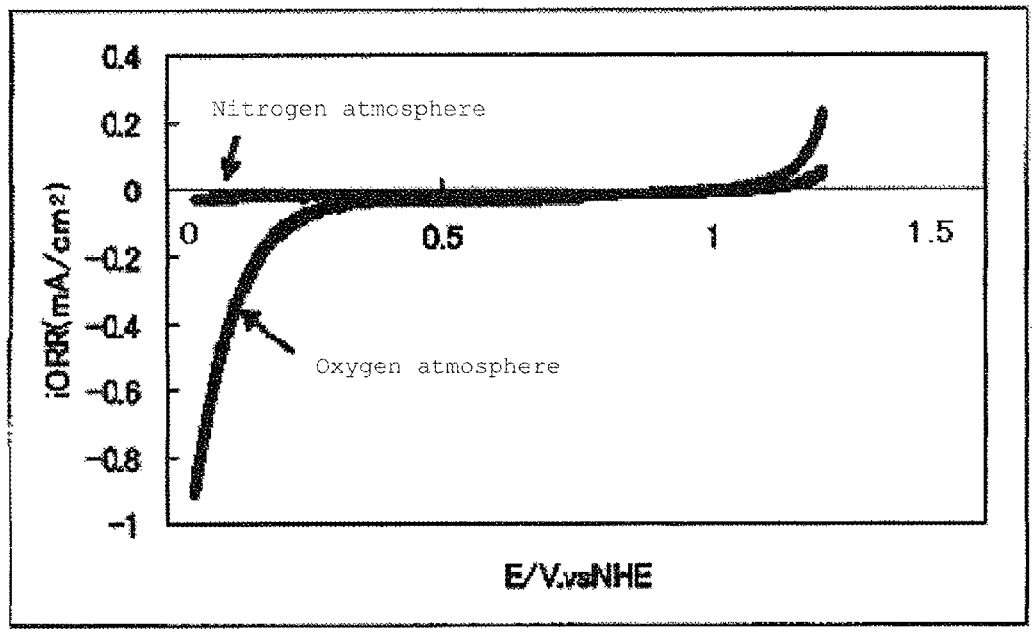
FIG. 28 is a graph evaluating oxygen reduction ability of an electrode (9) for a fuel cell of Comparative Example 1.

A current-potential curve obtained by the measurement is shown in FIG. 28.

The electrode (9) for a fuel cell prepared in comparative Example 1 had an onset potential for oxygen reduction reaction of 0.45 V (vs. NHE) and proved to have low oxygen reduction ability.

Example 9

1. Preparation of catalyst 8.92 g (85 mmol) of niobium carbide, 1.25 g (10 mmol) of niobium oxide and 0.54 g (5 mmol) of niobium nitride were well mixed and heated at 1600° C. for 3 hours in a nitrogen atmosphere, whereby 10.40 g of niobium carbonitride was obtained. Since the niobium carbonitride was a sintered body, it was crushed by a planetary ball mill (zirconia 3 mm).

The BET specific surface area of the resulting niobium carbonitride was 10.2 $m^2/g$. The results of elemental analysis of the resulting niobium carbonitride are set forth in Table 1.

In a tube furnace, 1.02 g of the resulting niobium carbonitride was heated at 800° C. for 1 hour with flowing argon gas containing oxygen gas of 1% by volume, whereby 1.10 g of a niobium oxycarbonitride (also referred to as a "catalyst (10)" hereinafter) was obtained.

Figure 18:
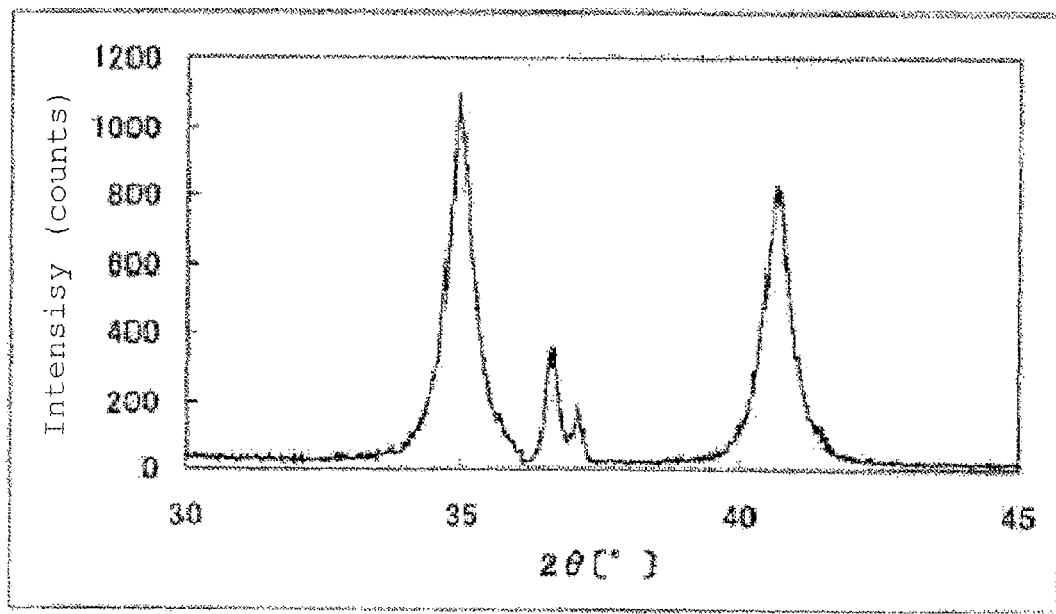
FIG. 18 is an X-ray powder diffraction spectrum of a catalyst (10) of Example 9.

An X-ray powder diffraction spectrum of the catalyst (10) is shown in FIG. 18. Between diffraction angles 2θ of 33° and 43°, 4 diffraction peaks were observed. The results of elemental analysis of the catalyst (10) are set forth in Table 2. The BET specific surface area of the catalyst (10) was 41 $m^2/g$.

2. Preparation of Electrode for Fuel Cell

An electrode (8) for a fuel cell was obtained in the same manner as in Example 1, except that the catalyst (10) was used.

3. Evaluation of Oxygen Reduction Ability

Catalytic ability (oxygen reduction ability) was evaluated in the same manner as in Example 1, except that the electrode (10) for a fuel cell was used.

Figure 29:
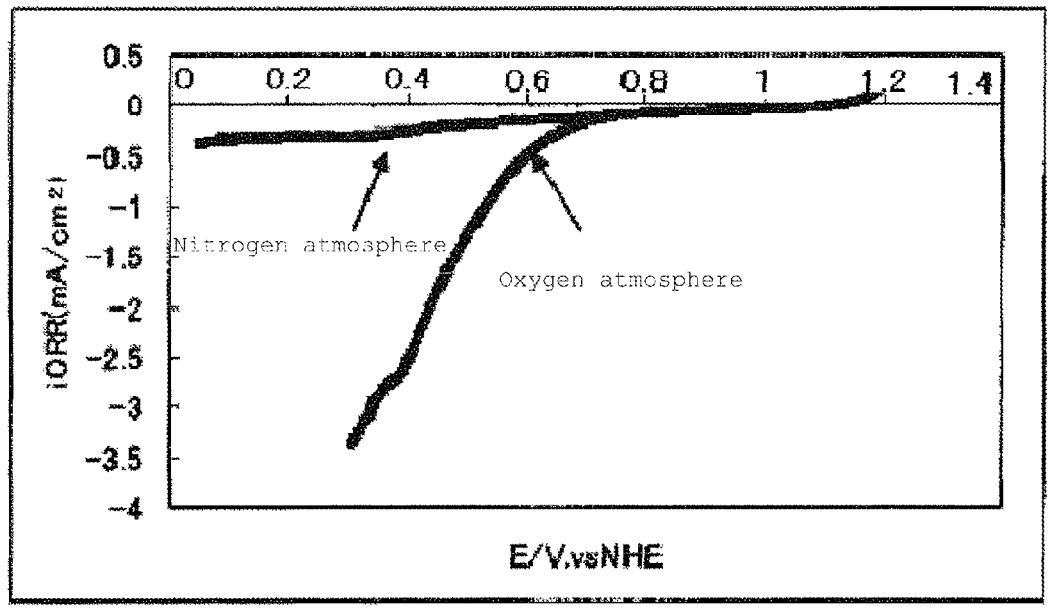
FIG. 29 is a graph evaluating oxygen reduction ability of an electrode (10) for a fuel cell of Example 9.

A current-potential curve obtained by the measurement is shown in FIG. 29.

The electrode (10) for a fuel cell prepared in Example 10 had an onset potential for oxygen reduction reaction of 0.84 V (vs. NHE) and proved to have high oxygen reduction ability.

Example 10

1. Preparation of Catalyst 8.92 g (85 mmol) of niobium carbide, 1.25 g (10 mmol) of niobium oxide and 0.54 g (5 mmol) of niobium nitride were well mixed and heated at 1600° C. for 3 hours in a nitrogen atmosphere, whereby 10.40 g of niobium carbonitride was obtained. The resulting niobium carbonitride was lightly crushed by an automatic mortar. In water, 2.70 g of the niobium carbonitride thus crushed was further crushed by a planetary ball mill (zirconia 1 mm) to obtain a suspension. Using an ultracentrifugal separator (10000 rpm), 1.50 g of a precipitate (niobium carbonitride) was separated from the suspension. The residual suspension was freeze dried, whereby 1.15 g of a powder (niobium carbonitride) was obtained.

The BET specific surface area of the precipitate was 12.1 $m^2/g$, and the BET specific surface area of the suspension was 29.8 $m^2/g$.

In a tube furnace, 1.02 g of the resulting precipitate (niobium carbonitride) was heated at 600° C. for 1 hour with flowing argon gas containing oxygen gas of 0.5% by volume, whereby 1.10 g of a niobium oxycarbonitride (also referred to as a "catalyst (11)" hereinafter) was obtained.

Figure 19:
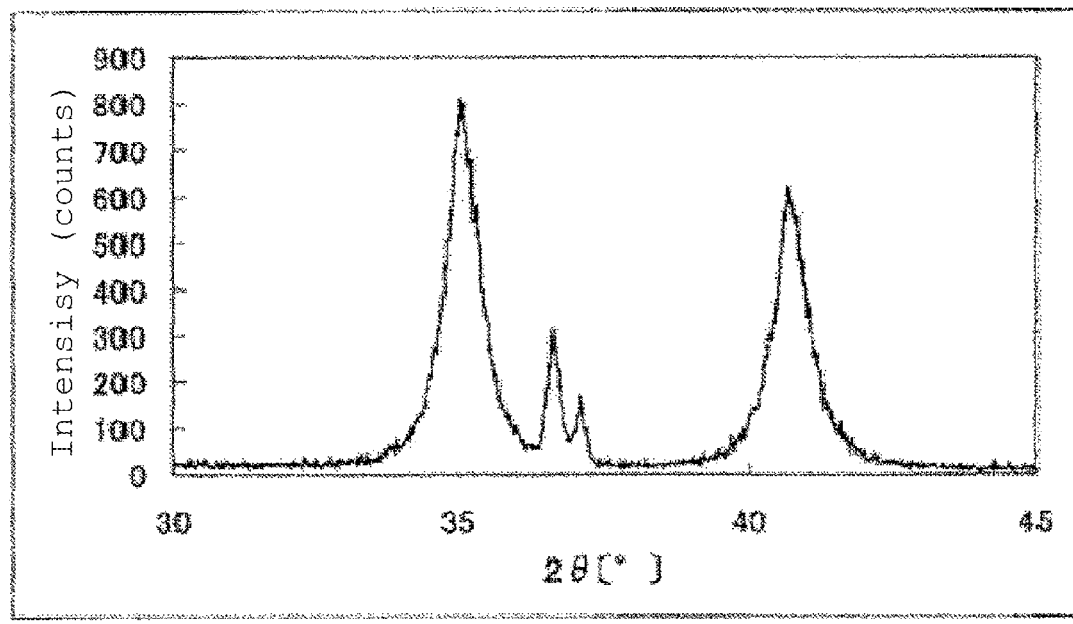
FIG. 19 is an X-ray powder diffraction spectrum of a catalyst (11) of Example 10.

An X-ray powder diffraction spectrum of the catalyst (11) is shown in FIG. 19. Between diffraction angles 2θ of 33° and 43°, 4 diffraction peaks were observed.

In a tube furnace, 1.02 g of the resulting powder (niobium carbonitride) was heated at 600° C. for 1 hour with flowing argon gas containing oxygen gas of 0.5% by volume, whereby 1.13 g of a niobium oxycarbonitride (also referred to as a "catalyst (12)" hereinafter) was obtained.

Figure 20:
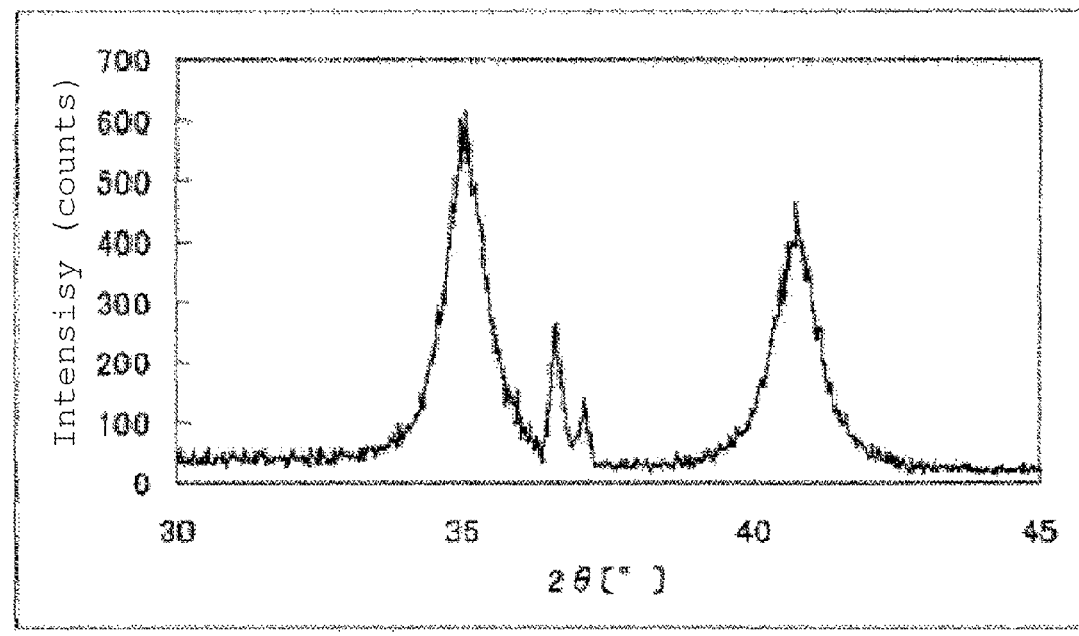
FIG. 20 is an X-ray powder diffraction spectrum of a catalyst (12) of Example 10.

An X-ray powder diffraction spectrum of the catalyst (12) is shown in FIG. 20. Between diffraction angles 2θ of 33° and 43°, 4 diffraction peaks were observed. The BET specific surface area of the catalyst (11) was 48 $m^2/g$, and the BET specific surface area of the electrode catalyst (12) was 119 $m^2/g$.

2. Preparation of Electrode for Fuel Cell

An electrode (11) or (12) for a fuel cell was obtained in the same manner as in Example 1, except that the catalyst (11) or (12) was used.

3. Evaluation of Oxygen Reduction Ability

Catalytic ability (oxygen reduction ability) was evaluated in the same manner as in Example 1, except that the electrode (11) or (12) for a fuel cell was used.

The electrode (11) for a fuel cell prepared in Example 10 had an onset potential for oxygen reduction reaction of O. 85 V (vs. NHE) and proved to have high oxygen reduction ability. The electrode (12) for a fuel cell prepared in Example 10 had an onset potential for oxygen reduction reaction of 0.86 V (vs. NHE) and proved to have high oxygen reduction ability.

Example 11

1. Preparation of catalyst

To 10 ml of anhydrous ethanol, 3.18 g (10 mmol) of niobium pentaethoxide is added, then 570 mg (47.5 mmol) of carbon (available from Cabot Corporation, Vulcan 72) is further added, and they are well stirred. Then, 1 ml of ion-exchanged water was added, followed by stirring for 1 hour. Ethanol is carefully removed, and the remainder is dried and then heated at 1600° C. for 3 hours in a nitrogen atmosphere, whereby 1.20 g of niobium carbonitride was obtained. Since the niobium carbonitride was a sintered body, it was crushed by a ball mill. The BET specific surface area of the resulting niobium carbonitride was 6.0 m$^2$/g.

In a tube furnace, 1.03 g of the resulting niobium carbonitride was heated at 800° C. for 1 hour with flowing argon gas containing oxygen gas of 1% by volume, whereby 1.10 g of a niobium oxycarbonitride (also referred to as a "catalyst (13)" hereinafter) was obtained.

Figure 21:
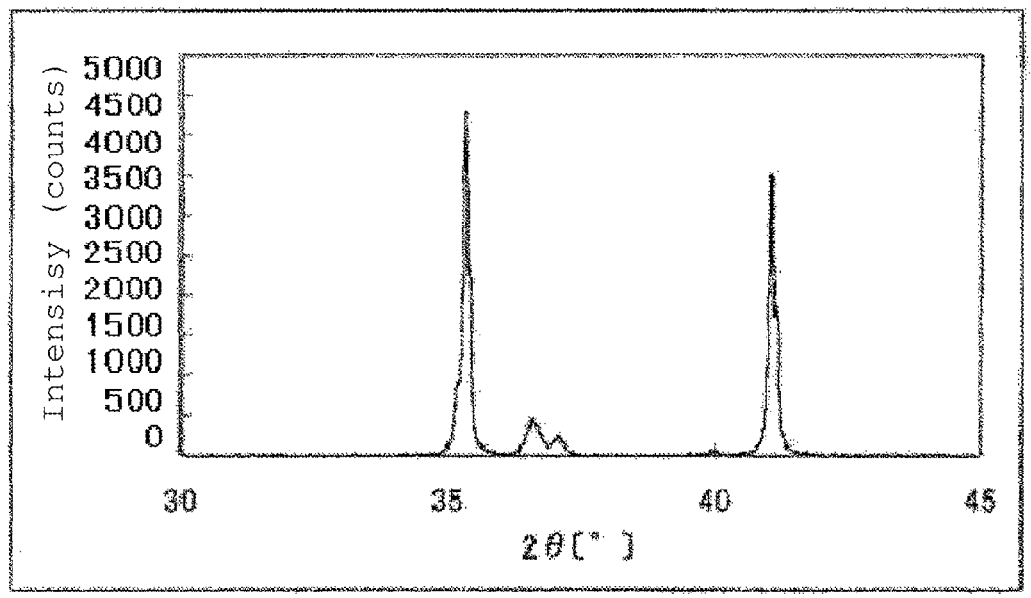
FIG. 21 is an X-ray powder diffraction spectrum of a catalyst (13) of Example 11.

An X-ray powder diffraction spectrum of the catalyst (13) is shown in FIG. 21. Between diffraction angles 2θ of 33° and 43°, 4 diffraction peaks were observed. The BET specific surface area of the electrode catalyst (13) was 24.1 m$^2$/g.

2. Preparation of Electrode for Fuel Cell

An electrode (12) for a fuel cell was obtained in the same manner as in Example 1, except that the catalyst (13) was used.

3. Evaluation of Oxygen Reduction Ability

Catalytic ability (oxygen reduction ability) was evaluated in the same manner as in Example 1, except that the electrode (13) for a fuel cell was used.

The electrode (13) for a fuel cell prepared in Example 11 had an onset potential for oxygen reduction reaction of 0.82 V (vs. NHE) and proved to have high oxygen reduction ability.

Example 12

1. Preparation of Catalyst

In a tube furnace, 1.05 g of niobium carbonitride prepared in Example 8 was heated at 900° C. for 6 hours with flowing nitrogen gas containing oxygen gas of 1% by volume and hydrogen gas of 0.8% by volume, whereby 1.32 g of a niobium oxycarbonitride (also referred to as a "catalyst (14)" hereinafter) was obtained.

Figure 22:
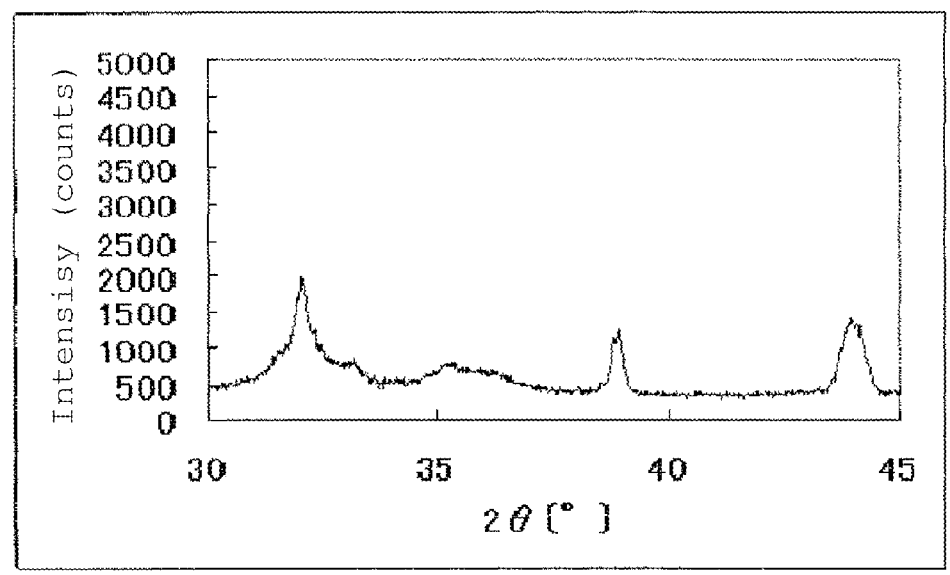
FIG. 22 is an X-ray powder diffraction spectrum of a catalyst (14) of Example 12.
Figure 23:
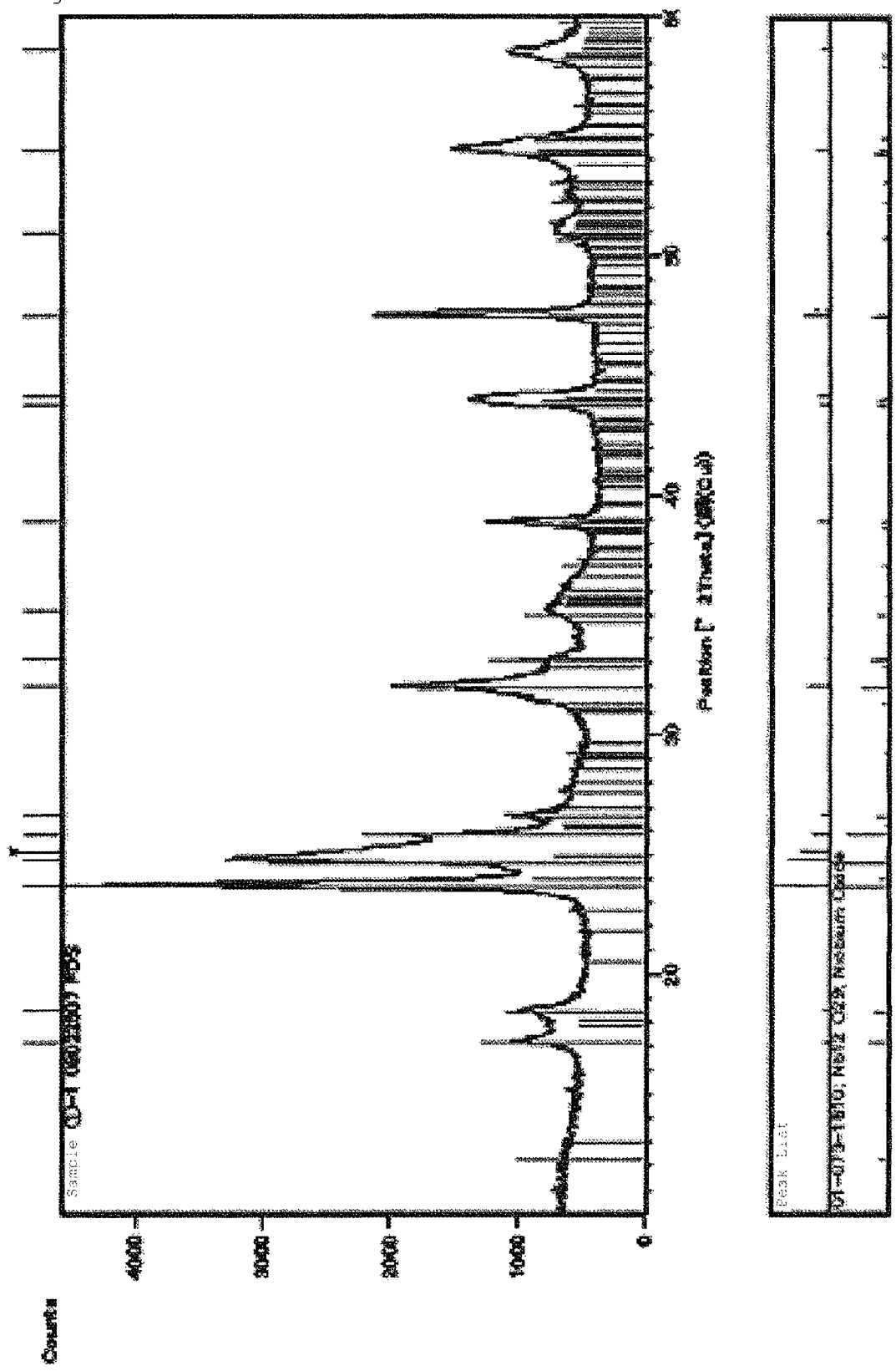
FIG. 23 is a group of views obtained by peak analysis of an X-ray powder diffraction spectrum of a catalyst (14) of Example 12.

An X-ray powder diffraction spectrum of the catalyst (14) is shown in FIG. 22. Between diffraction angles 2θ of 33° and 43°, 2 diffraction peaks were observed. When the spectrum was subjected to spectral retrieval, a peak derived from $Nb_{12}O_{29}$ was confirmed, as shown in FIG. 23. The results of elemental analysis of the catalyst (14) are set forth in Table 2. The BET specific surface area of the catalyst (14) was 2.0 m$^2$/g.

2. Preparation of Electrode for Fuel Cell

An electrode (14) for a fuel cell was obtained in the same manner as in Example 1, except that the catalyst (14) was used.

3. Evaluation of Oxygen Reduction Ability

Catalytic ability (oxygen reduction ability) was evaluated in the same manner as in Example 1, except that the electrode (14) for a fuel cell was used.

Figure 30:
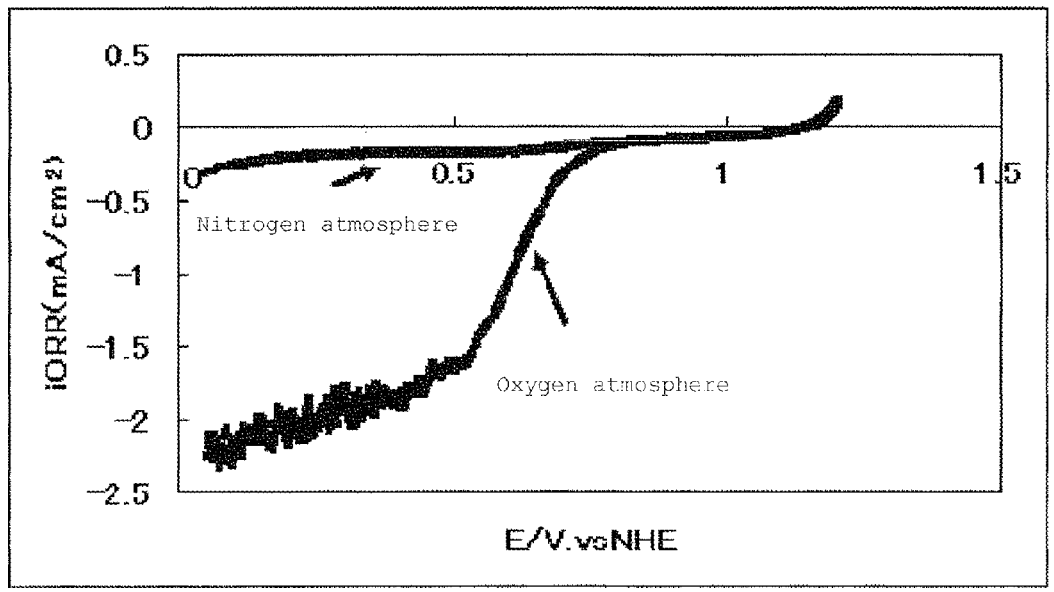
FIG. 30 is a graph evaluating oxygen reduction ability of an electrode (14) for a fuel cell of Example 12.

A current-potential curve obtained by the measurement is shown in FIG. 30.

The electrode (14) for a fuel cell prepared in Example 12 had an onset potential for oxygen reduction reaction of 0.88 V (vs. NHE) and proved to have high oxygen reduction ability.

Example 13

1. Preparation of Catalyst 5.88 g (56 mmol) of niobium carbide and 5.14 g (48 mmol) of niobium oxide were well mixed and heated at 1600° C. for 3 hours in a nitrogen atmosphere, whereby 10.82 g of niobium carbonitride was obtained. Since the niobium carbonitride was a sintered body, it was crushed by a ball mill.

Figure 9:
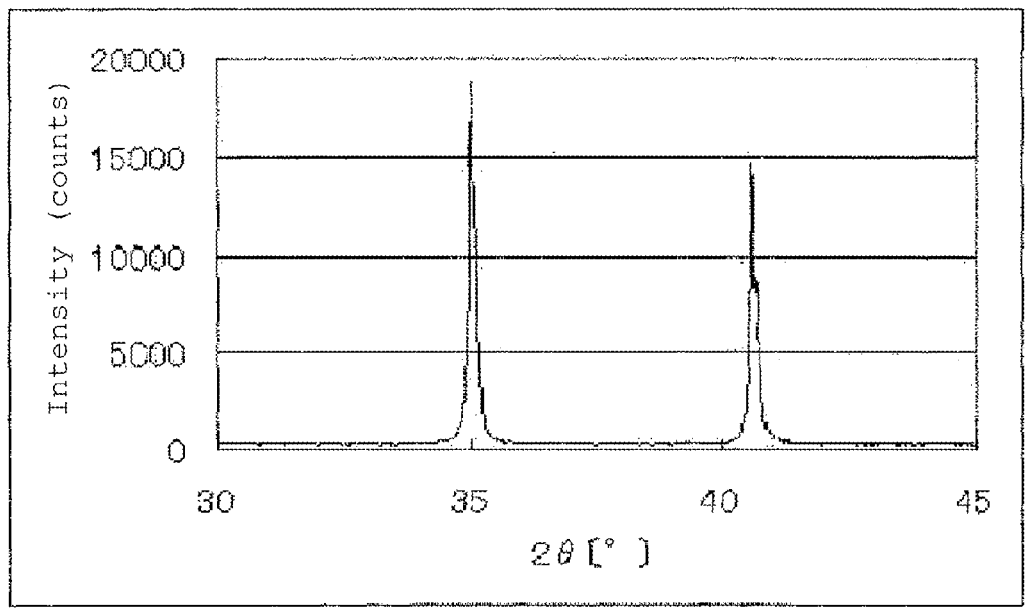
FIG. 9 is an X-ray powder diffraction spectrum of niobium carbonitride of Example 13.

An X-ray powder diffraction spectrum of the resulting niobium carbonitride is shown in FIG. 9. The results of elemental analysis of the resulting niobium carbonitride are set forth in Table 1.

In a tube furnace, 1.05 g of the resulting niobium carbonitride was heated at 900° C. for 6 hours with flowing nitrogen gas containing oxygen gas of 1% by volume and hydrogen gas of 0.8% by volume, whereby 1.33 g of a niobium oxycarbonitride (also referred to as a "catalyst (15)" hereinafter) was obtained.

Figure 24:
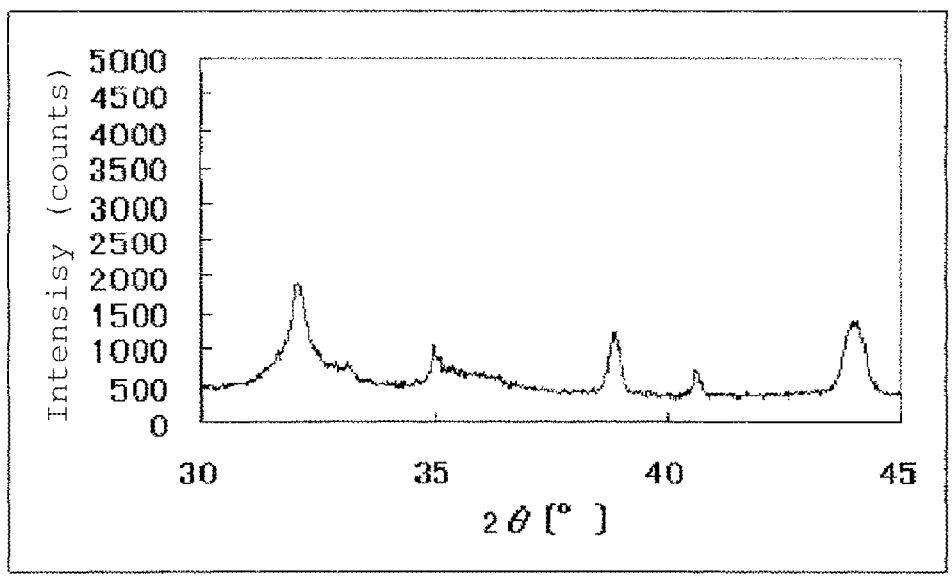
FIG. 24 is an X-ray powder diffraction spectrum of a catalyst (15) of Example 13.

An X-ray powder diffraction spectrum of the catalyst (15) is shown in FIG. 24. Between diffraction angles 2θ of 33° and 43°, 4 diffraction peaks were observed. The results of elemental analysis of the catalyst (15) are set forth in Table 2. The BET specific surface area of the catalyst (15) was 2.1 m$^2$/g.

2. Preparation of Electrode for Fuel Cell

An electrode (15) for a fuel cell was obtained in the same manner as in Example 1, except that the catalyst (15) was used.

3. Evaluation of Oxygen Reduction Ability

Catalytic ability (oxygen reduction ability) was evaluated in the same manner as in Example 1, except that the electrode (15) for a fuel cell was used.

Figure 31:
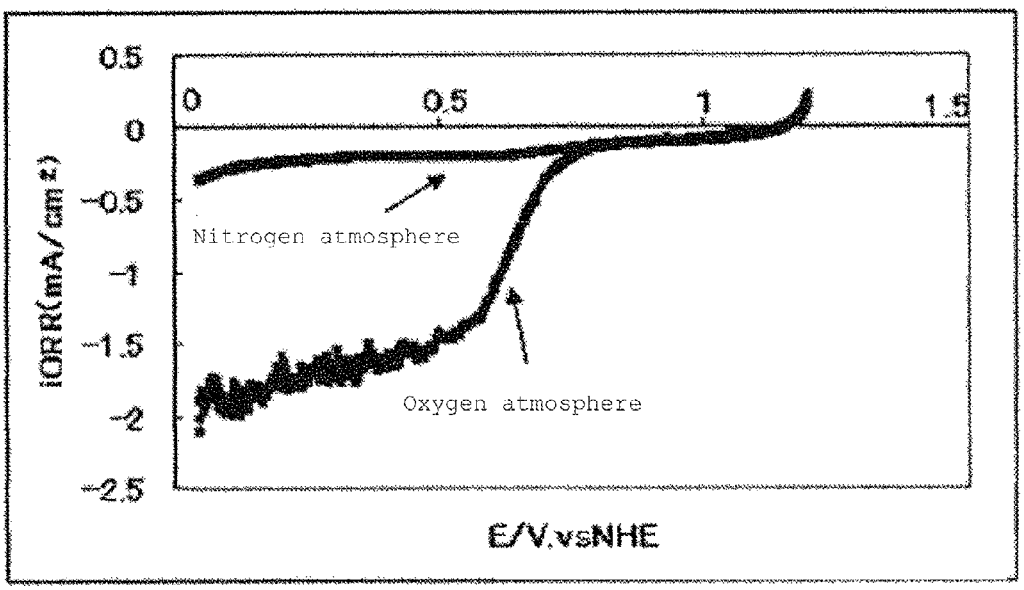
FIG. 31 is a graph evaluating oxygen reduction ability of an electrode (15) for a fuel cell of Example 13.

A current-potential curve obtained by the measurement is shown in FIG. 31.

The electrode (15) for a fuel cell prepared in Example 13 had an onset potential for oxygen reduction reaction of 0.90 V (vs. NHE) and proved to have high oxygen reduction ability.

TABLE 1

Results of elemental analysis of niobium carbonitride, etc.
(% by mass (numeral in parentheses: ratio of number of atoms to that of Nb))

| | Raw materials | Nb | C | N | O | Composition |
|---|---|---|---|---|---|---|
| Example 1 | NbO2 + 2.5C | 86.6 | 3.9 | 8.5 | | $NbC_{0.35}N_{0.65}$ |
| | | (1) | (0.35) | (0.65) | | |
| Example 2 | NbO2 + 2C | 85.3 | 0.2 | 12.2 | 2.3 | $NbC_{0.02}N_{0.95}O_{0.16}$ |
| | | (1) | (0.02) | (0.95) | (0.16) | |
| Example 3 | NbO2 + 3C | 88.1 | 8 | 3.9 | | $NbC_{0.70}N_{0.29}$ |
| | | (1) | (0.7) | (0.29) | | |
| Example 4 | NbO + 1.5C | 87.7 | 4.5 | 7.8 | | $NbC_{0.4}N_{0.59}$ |
| | | (1) | (0.4) | (0.59) | | |
| Example 5 | NbO + 2C | 88.4 | 9.8 | 1.8 | | $NbC_{0.85}N_{0.14}$ |
| | | (1) | (0.86) | (0.14) | | |
| Example 6 | Nb2O5 + 4.5C | 81.6 | 0.1 | 10 | 8.3 | $NbC_{0.01}N_{0.81}O_{0.59}$ |
| | | (1) | (0.01) | (0.81) | (0.59) | |
| Example 7 | Nb2O5 + 7C | 87.3 | 8.7 | 3 | | $NbC_{0.77}N_{0.23}$ |
| | | (1) | (0.77) | (0.23) | | |
| Example 8 | NbC + NbO2 + NbN | 83.4 | 5.87 | 5.53 | | $NbC_{0.55}N_{0.44}$ |
| | | (1) | (0.55) | (0.44) | | |
| Example 9 | NbC + NbO2 + NbN | 90.3 | 5.43 | 4.27 | | $NbC_{0.49}N_{0.33}$ |
| | | (1) | (0.49) | (0.33) | | |
| Example 13 | NbC + NbN | 87.8 | 6.23 | 5.98 | | $NbC_{0.55}N_{0.45}$ |
| | | (1) | (0.55) | (0.45) | | |

TABLE 2

Results of elemental analysis of catalyst
(% by mass (numeral in parentheses: ratio of number of atoms to that of Nb))

| | Niobium carbonitride, etc. | Nb | C | N | O | Composition |
|---|---|---|---|---|---|---|
| Example 1 | $NbC_{0.39}N_{0.73}$ | 79 | 2.9 | 6.5 | 10.1 | $NbC_{0.32}N_{0.61}O_{0.82}$ |
| | | (1) | (0.32) | (0.61) | (0.82) | |
| Example 2 | $NbC_{0.02}N_{0.95}O_{0.16}$ | 76 | 0.1 | 5.9 | 18.2 | $NbC_{0.01}N_{0.50}O_{1.39}$ |
| | | (1) | (0.01) | (0.5) | (1.39) | |
| Example 3 | $NbC_{0.70}N_{0.29}$ | 78.6 | 5.8 | 2.6 | 13 | $NbC_{0.57}N_{0.22}O_{0.96}$ |
| | | (1) | (0.57) | (0.22) | (0.96) | |
| Example 4 | $NbC_{0.4}N_{0.59}$ | 76 | 2.2 | 3.5 | 17.9 | $NbC_{0.22}N_{0.31}O_{1.37}$ |
| | | (1) | (0.22) | (0.31) | (1.37) | |
| Example 5 | $NbC_{0.85}N_{0.14}$ | 79 | 6.8 | 1.2 | 13.1 | $NbC_{0.67}N_{0.10}O_{0.96}$ |
| | | (1) | (0.67) | (0.1) | (0.96) | |
| Example 6 | $NbC_{0.01}N_{0.81}O_{0.59}$ | 75.6 | 0.1 | 3.9 | 20.4 | $NbC_{0.01}N_{0.34}O_{1.57}$ |
| | | (1) | (0.01) | (0.34) | (1.57) | |
| Example 7 | $NbC_{0.60}N_{0.23}$ | 72.9 | 2.6 | 0.54 | 22.2 | $NbC_{0.28}N_{0.05}O_{1.77}$ |
| | | (1) | (0.28) | (0.05) | (1.77) | |
| Example 8 | $NbC_{0.55}N_{0.44}$ | 76.5 | 4.69 | 4.28 | 8.98 | $NbC_{0.48}N_{0.37}O_{0.68}$ |
| | | (1) | (0.48) | (0.37) | (0.68) | |
| Example 9 | $NbC_{0.49}N_{0.33}$ | 76.5 | 4.1 | 3.1 | 14.6 | $NbC_{0.41}N_{0.27}O_{1.11}$ |
| | | (1) | (0.41) | (0.27) | (1.11) | |
| Example 12 | $NbC_{0.55}N_{0.44}$ | 75.3 | 4.33 | 2.79 | 17.54 | $NbC_{0.45}N_{0.25}O_{1.35}$ |
| | | (1) | (0.45) | (0.25) | (1.35) | |
| Example 13 | $NbC_{0.55}N_{0.44}$ | 75.4 | 4.29 | 2.61 | 17.7 | $NbC_{0.44}N_{0.23}O_{1.36}$ |
| | | (1) | (0.44) | (0.23) | (1.36) | |
| Comparative Example 1 | NbC + NbO2 + NbN | 83.4 | 5.87 | 5.53 | | $NbC_{0.55}N_{0.44}$ |
| | | (1) | (0.55) | (0.44) | | |

TABLE 3

Onset potential for oxygen reduction reaction of catalyst

| | Onset potential for oxygen reduction reaction (E/V vs. NHE) |
|---|---|
| Example 1 | 0.85 |
| Example 2 | 0.75 |
| Example 3 | 0.72 |
| Example 4 | 0.68 |
| Example 5 | 0.65 |
| Example 6 | 0.66 |
| Example 7 | 0.82 |
| Example 8 | 0.88 |
| Example 9 | 0.84 |
| Example 10 | 0.85 |
| Example 10 | 0.86 |
| Example 11 | 0.82 |
| Example 12 | 0.88 |
| Example 13 | 0.9 |
| Comparative example 1 | 0.45 |

Industrial Applicability

Since the catalyst of the invention is not corroded in an acidic electrolyte or at a high potential, is excellent in durability and has high oxygen reduction ability, it can be used for a catalyst layer for a fuel cell, an electrode, an electrode joined body or a fuel cell.

The invention claimed is:

1. A catalyst comprising a niobium oxycarbonitride represented by the composition formula $NbC_xN_yO_z$, wherein x, y and z represent a ratio of the numbers of atoms and are numbers satisfying the conditions of $0.01 \leq x \leq 2$, $0.23 \leq y \leq 0.5$, $0.01 \leq z \leq 3$ and $1.53 \leq x+y+z \leq 5$, and having a BET specific surface area in the range of 1 to 1000 m²/g.

2. The catalyst as claimed in claim 1, wherein when the niobium oxycarbonitride is measured by X-ray powder diffractometry (Cu—Kα radiation), two or more diffraction peaks are observed between diffraction angles 2θ of 33° and 43°.

3. The catalyst as claimed in claim 1, wherein the niobium oxycarbonitride is a mixture consisting of several phases, and when the niobium oxycarbonitride is measured by X-ray powder diffractometry (Cu—Kα radiation), a peak derived from $Nb_{12}O_{29}$ is observed.

4. A catalyst layer for a fuel cell, comprising the catalyst as claimed in claim 1.

5. The catalyst layer for a fuel cell as claimed in claim 4, further comprising electron conductive particles.

6. An electrode having a catalyst layer for a fuel cell and a porous support layer, wherein the catalyst layer for a fuel cell is the catalyst layer for a fuel cell as claimed in claim 4.

7. A membrane electrode assembly having a cathode, an anode and an electrolyte membrane arranged between the cathode and the anode, wherein the cathode and/or the anode is the electrode as claimed in claim 6.

8. A fuel cell having the membrane electrode assembly as claimed in claim 7.

9. A solid polymer type fuel cell having the membrane electrode assembly as claimed in claim 7.

10. A process for preparing the catalyst as claimed in claim 1, comprising a step of heat-treating niobium carbonitride in an inert gas containing oxygen gas to obtain a niobium oxycarbonitride.

11. The process for preparing the catalyst as claimed in claim 10, wherein the inert gas further contains hydrogen gas.

12. The process for preparing the catalyst as claimed in claim 10, further comprising a step of crushing the niobium carbonitride.

13. The preparation process as claimed in claim 10, wherein the temperature of the heat-treating is in the range of 400 to 1400° C.

14. The preparation process as claimed in claim 10, wherein the oxygen gas concentration in the inert gas is in the range of 0.1 to 10% by volume.

15. The preparation process as claimed in claim 11, wherein the hydrogen gas concentration in the inert gas is not more than 5% by volume.

\* \* \* \* \*